United States Patent
Nishio et al.

(10) Patent No.: US 11,549,664 B2
(45) Date of Patent: Jan. 10, 2023

(54) PORTABLE LIGHTING DEVICE AND LIGHTING METHOD

(71) Applicant: DAI NIPPON PRINTING CO., LTD., Tokyo (JP)

(72) Inventors: Shumpei Nishio, Tokyo (JP); Kaori Nakatsugawa, Tokyo (JP); Makio Kurashige, Tokyo (JP); Kazutoshi Ishida, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/297,103

(22) PCT Filed: Nov. 29, 2019

(86) PCT No.: PCT/JP2019/046771
§ 371 (c)(1),
(2) Date: May 26, 2021

(87) PCT Pub. No.: WO2020/111228
PCT Pub. Date: Jun. 4, 2020

(65) Prior Publication Data
US 2022/0018521 A1 Jan. 20, 2022

(30) Foreign Application Priority Data

Nov. 29, 2018 (JP) .............................. JP2018-224011
May 14, 2019 (JP) .............................. JP2019-091675

(51) Int. Cl.
*F21L 4/00* (2006.01)
*F21V 14/06* (2006.01)
*F21Y 115/30* (2016.01)

(52) U.S. Cl.
CPC .............. *F21V 14/065* (2013.01); *F21L 4/00* (2013.01); *F21Y 2115/30* (2016.08)

(58) Field of Classification Search
CPC ........ F21V 5/008; F21V 14/065; F21V 14/06; F21V 17/02; F21Y 2115/30; F21L 4/00; G02B 5/18; G03B 21/2033
See application file for complete search history.

(56) References Cited

U.S. PATENT DOCUMENTS

| 6,022,126 A * | 2/2000 | Sekine ................... G02B 27/20 362/187 |
| 9,810,404 B1 * | 11/2017 | Corey ................... F21S 10/007 |
| 2009/0180283 A1 * | 7/2009 | Chu ....................... G02B 27/20 362/259 |

FOREIGN PATENT DOCUMENTS

| CN | 204287617 U | 4/2015 |
| JP | S50-23182 U | 3/1975 |

(Continued)

OTHER PUBLICATIONS

International Search Report dated Feb. 18, 2020 for the corresponding PCT Application No. PCT/JP2019/046771, with English machine translation.

(Continued)

*Primary Examiner* — Y M. Quach Lee
(74) *Attorney, Agent, or Firm* — Michael Best & Friedrich LLP

(57) ABSTRACT

A portable lighting device includes: a coherent light source; a shaping optical system that shapes coherent light emitted from the coherent light source; and a diffractive optical element that diffracts the coherent light shaped by the shaping optical system to a surface to be irradiated (IP). The diffractive optical element is rotatably supported. The surface to be irradiated is lighted in a pattern depending on a diffraction pattern of the diffractive optical element.

23 Claims, 23 Drawing Sheets

(56) References Cited

FOREIGN PATENT DOCUMENTS

| | | |
|---|---|---|
| JP | H07-318856 A | 12/1995 |
| JP | 2004-253226 A | 9/2004 |
| JP | 2009-086025 A | 4/2009 |
| JP | 2012-002871 A | 1/2012 |
| JP | 2012-146621 A | 8/2012 |
| JP | 2013-134353 A | 7/2013 |
| JP | 2016-090318 A | 5/2016 |
| WO | 2018-124075 A1 | 7/2018 |

OTHER PUBLICATIONS

English translation of International Preliminary Report on Patentability dated Jun. 10, 2021 for the corresponding PCT Application No. PCT/JP2019/046771.
Chinese Office Action dated Mar. 22, 2022, for the corresponding Chinese Patent Application No. 201980078537.0, with English translation.
Japanese Office Action dated Dec. 7, 2021 for the corresponding Japanese Patent Application No. 2020-202158, with English translation.

* cited by examiner

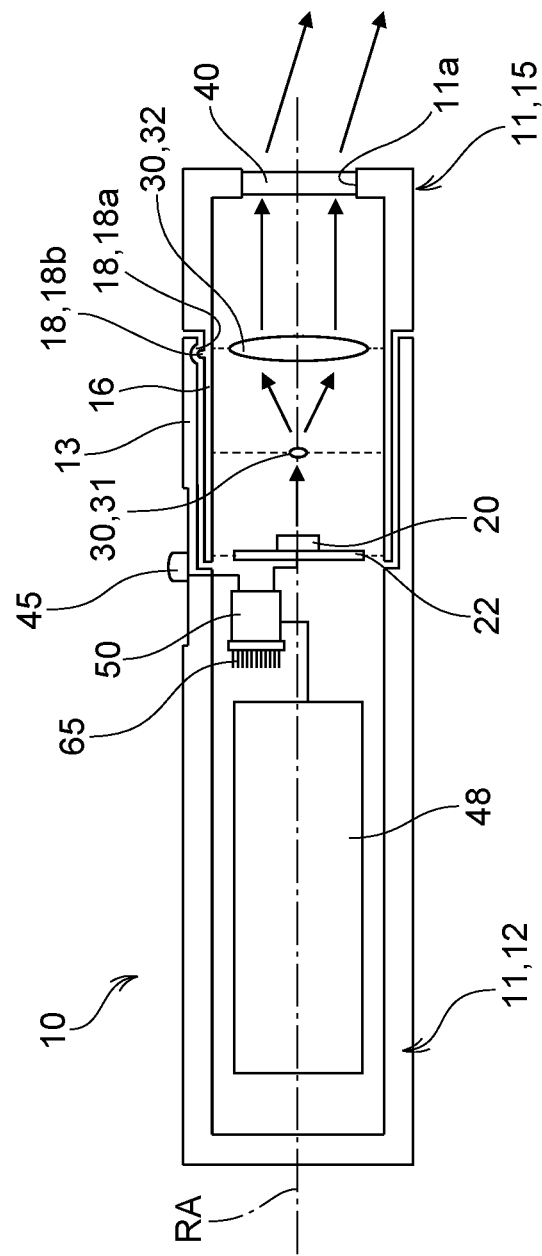

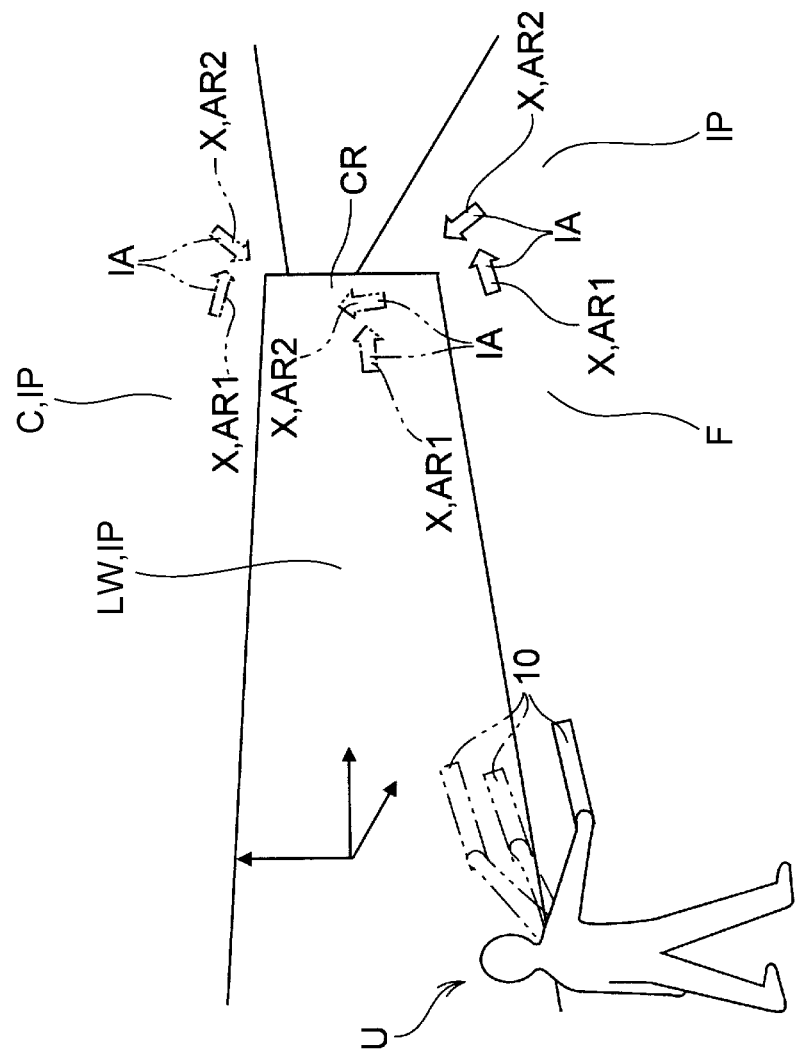

PORTABLE LIGHTING DEVICE AND LIGHTING METHOD

CROSS-REFERENCE TO RELATED APPLICATIONS

This application is entering into the national phase of PCT Application No. PCT/JP2019/046771, filed on Nov. 29, 2019. Further, this application claims the benefit of priority from Japanese Application Numbers 2018-224011, filed on Nov. 29, 2018, and 2019-091675, filed on May 14, 2019, the entire contents of which are incorporated herein by reference.

TECHNICAL FIELD

The present disclosure relates to a portable lighting device and a lighting method.

BACKGROUND ART

A lighting device using a diffractive optical element is known, as disclosed in Patent Document 1 (JP2012-146621A), for example. The use of diffractive optical element makes it possible to light a surface to be irradiated in a desired pattern.

On the other hand, the disclosers are considering applying a lighting device using a diffractive optical element to a portable lighting device. A user can carry a portable lighting device to perform pattern-lighting at a desired place.

However, diffraction pattern by a diffractive optical element is deigned on the assumption that the diffractive optical element and a surface to be irradiated have a constant positional relationship. On the other hand, when a portable lighting device is used, it may be desired to light a wall or a ceiling instead of a ground surface or a floor in a pattern. For example, when an arrow for guiding participants in an event or the like is displayed by pattern-lighting, which of a ground surface or floor, a wall and a ceiling is the most suitable for a surface to be irradiated changes depending on the degree of congestion, etc. In this case, when an orientation of the projection surface changes, an orientation of the pattern to be lighted also changes. When a pattern that displays a direction, such as an arrow, is lighted, there particularly arises a problem in that a different direction is displayed.

DISCLOSURE

Namely, because of the aforementioned problem, it is difficult to make use of the convenience unique to a portable lighting device. The present disclosure has been made in view of such circumstances. The object thereof is to improve the convenience of a portable lighting device. In addition, the object thereof is to provide a lighting method capable of eliminating the aforementioned problem.

A first portable lighting device according to the present disclosure comprises:
 a coherent light source;
 a shaping optical system that shapes coherent light emitted from the coherent light source; and
 a diffractive optical element that diffracts the coherent light shaped by the shaping optical system to a surface to be irradiated;
 wherein:
 the diffractive optical element is rotatably supported; and
the surface to be irradiated is lighted in a pattern depending on a diffraction pattern of the diffractive optical element.

A second portable lighting device according to the present disclosure comprises:
 a coherent light source;
 a scanner that changes an optical path of coherent light emitted from the coherent light source; and
 a diffractive optical element that diffracts the coherent light whose optical path has been changed by the scanner to a surface to be irradiated;
 wherein:
 the scanner changes an optical path of the coherent light such that the coherent light scans the diffractive optical element;
 the diffractive optical element is rotatably supported; and
 the surface to be irradiated is lighted in a pattern depending on a diffraction pattern of the diffractive optical element.

A third portable lighting device according to the present disclosure comprises:
 a coherent light source;
 a shaping optical system that shapes coherent light emitted from the coherent light source;
 a scanner that changes an optical path of the coherent light shaped by the shaping optical system; and
 a diffractive optical element that diffracts the coherent light whose optical path has been changed by the scanner to a surface to be irradiated;
 wherein:
 the scanner changes an optical path of the coherent light such that the coherent light scans the diffractive optical element;
 the diffractive optical element is rotatably supported; and
 the surface to be irradiated is lighted in a pattern depending on a diffraction pattern of the diffractive optical element.

In the first to third portable lighting devices according to the present disclosure, the diffractive optical element may be supported to be relatively rotatable with respect to the shaping optical system.

In the first to third portable lighting devices according to the present disclosure, the diffractive optical element may be supported to be relatively rotatable with respect to the coherent light source.

In the first to third portable lighting devices according to the present disclosure, an angular range within which the diffractive optical element is rotatable may be 45° or more, preferably 90° or more, more preferably 180° or more, or further preferably 360° or more.

In the first to third portable lighting devices according to the present disclosure, the diffractive optical element may be supported to be rotatable about an axis line that is not parallel to a direction orthogonal to an optical axis of the coherent light incident on the diffractive optical element.

In the first to third portable lighting devices according to the present disclosure, the diffractive optical element may be supported to be rotatable about an axis line parallel to an optical axis of the coherent light incident on the diffractive optical element.

In the first to third portable lighting devices according to the present disclosure, a rotation axis line of the diffractive optical element may correspond to an optical axis of the coherent light incident on the diffractive optical element.

In the first to third portable lighting devices according to the present disclosure, an incident position of $0^{th}$-order light advancing from the diffractive optical element may be within an area on the surface to be irradiated, the coherent light diffracted by the diffractive optical element being incident on the area.

In the first to third portable lighting devices according to the present disclosure, a position at which a center axis line of the casing body intersects with the surface to be irradiated may be positioned within an area on the surface to be irradiated, the coherent light diffracted by the diffractive optical element being incident on the area.

The first to third portable lighting devices according to the present disclosure may further comprise a casing having a tubular casing body that supports the coherent light source, and a support body that supports the diffractive optical element and is rotatable with respect to the casing body, wherein a position at which a center axis line of the casing body intersects with the surface to be irradiated may be positioned within an area on the surface to be irradiated, the coherent light diffracted by the diffractive optical element being incident on the area.

In the first to third portable lighting devices according to the present disclosure, the coherent light may be incident on the same diffractive optical element before and after rotation of the diffractive optical element.

In the first to third portable lighting devices according to the present disclosure, the diffractive optical element may be located on a rotation axis line of the diffractive optical element.

In the first to third portable lighting devices according to the present disclosure, the coherent light incident on the diffractive optical element may include coherent light incident on a position at which a rotation axis line of the diffractive optical element intersects with the diffractive optical element.

In the first to third portable lighting devices according to the present disclosure, the coherent light incident on the diffractive optical element may include coherent light that advances on a rotation axis line of the diffractive optical element along the rotation axis line.

In the first to third portable lighting devices according to the present disclosure, the diffractive optical element may be held at any of preset positions.

The first to third portable lighting devices according to the present disclosure may further comprise a casing having a casing body that supports the coherent light source, and a support body that supports the diffractive optical element and is rotatable with respect to the casing body.

In the first to third portable lighting devices according to the present disclosure, the support body may hold an outer periphery of the diffractive optical element along its entire length.

In the first to third portable lighting devices according to the present disclosure, the casing body may be provided with a switch for operating the portable lighting device.

In the first to third portable lighting devices according to the present disclosure, the switch may be provided at a position apart from a rotation axis line of the diffractive optical element.

The first to third portable lighting devices according to the present disclosure may further comprise:

a detection unit that acquires information about at least one of an orientation of the portable lighting device and an orientation of the surface to be irradiated; and a rotation drive unit that rotates the diffractive optical element by a rotation amount based on a detection result of the detection unit.

The first to third portable lighting devices according to the present disclosure may further comprise a rotation drive unit that rotates the diffractive optical element by a rotation amount based on information from outside.

The first to third portable lighting devices according to the present disclosure may further comprise:

a detection unit that detects information about a state of the diffractive optical element; and a control unit that stops emission of the coherent light from the portable lighting device based on a detection result of the detection unit.

The first to third portable lighting devices according to the present disclosure may further comprise a heat dissipating means that promotes dissipation of heat from at least one of the coherent light source and a control unit that controls emission of the coherent light from the portable lighting device.

The first to third portable lighting devices according to the present disclosure may light the surface to be irradiated in a pattern displaying one or more of letter, picture, color pattern, symbol, mark, illustration, character, and pictogram.

The first to third portable lighting devices according to the present disclosure may further comprise a non-coherent light source.

The first to third portable lighting devices according to the present disclosure may further comprise a casing having a tubular casing body that supports the coherent light source, and a support body that supports the diffractive optical element and is rotatable with respect to the casing body, wherein the casing body may be provided with a transparent first liquid-proof member that hermetically seals an inside space of the casing body in which the coherent light source is housed.

In the first to third portable lighting devices according to the present disclosure, the support body may be provided with a transparent second liquid-proof member that hermetically seals an inside space of the support body, to which an uneven surface of the diffractive optical element is exposed.

The first to third portable lighting devices according to the present disclosure may further comprise a casing having a tubular casing body that supports the coherent light source, and a support body that supports the diffractive optical element and is rotatable with respect to the casing body, wherein:

the casing body may have a casing housing that supports the coherent light source, and a distal-end holder that is detachable from the casing housing and is rotatably connected to the support body; and the support body may be provided with a transparent second liquid-proof member that hermetically seals an inside space of the support body, to which an uneven surface of the diffractive optical element is exposed.

A first lighting method according to the present disclosure comprises:

a step adjusting a rotated position of a diffractive optical element of a lighting device based on a surface to be irradiated, wherein the lighting device comprises a coherent light source, and a diffractive optical element that is rotatable with respect to the coherent light source and diffracts coherent light from the coherent light source to a surface to be irradiated; and a step of lighting the surface to be irradiated in a pattern depending on a diffraction pattern of the diffractive optical element.

In the first lighting method according to the present disclosure, the rotated position of the diffractive optical element of the lighting device may be adjusted based on an orientation of the surface to be irradiated.

A second lighting method according to the present disclosure comprises:

a first lighting step of lighting a surface to be irradiated by using a lighting device that comprises a coherent light source, and a diffractive optical element that is rotatable with respect to the coherent light source and diffracts coherent light from the coherent light source to a surface to be irradiated; and a second lighting step of lighting another surface to be irradiated not parallel to the surface to be irradiated of the first lighting step by using the lighting device with the diffractive optical element rotated to a position different from that of the first lighting step.

A third lighting method according to the present disclosure comprises:

a first lighting step of lighting a surface to be irradiated by using a lighting device that comprises a coherent light source, and a diffractive optical element that diffracts coherent light from the coherent light source to a surface to be irradiated; and a second lighting step of lighting another surface to be irradiated not parallel to the surface to be irradiated of the first lighting step by using the lighting device with the lighting device rotated to a position different from that of the first lighting step.

The present disclosure can improve the convenience of a portable lighting device.

BRIEF DESCRIPTION OF THE DRAWINGS

FIG. 2D is a view corresponding to FIG. 2A, which is a vertical sectional view for explaining further another modification example of a casing included in the portable lighting device of FIG. 1.

FIG. 4A is a perspective view for explaining use manner of the portable lighting device of FIG. 1.

MODE FOR CARRYING OUT THE DISCLOSURE

Figure 1:
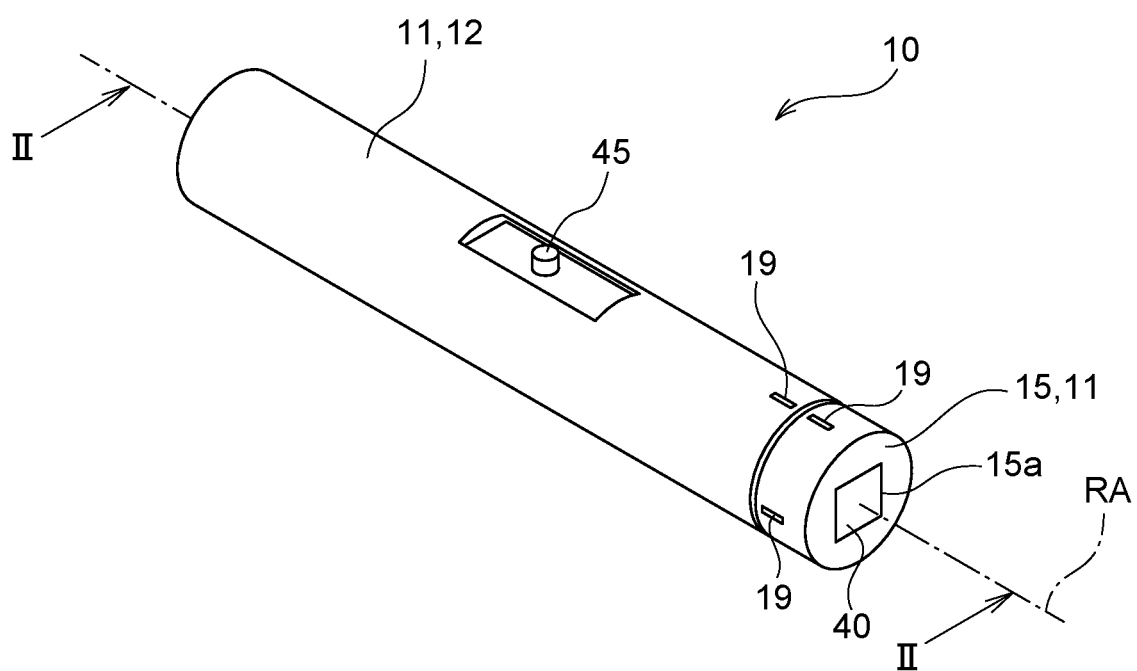
FIG. 1 is a view for explaining an embodiment, which is a perspective view showing a portable lighting device.

An embodiment of the present disclosure is described in detail below, with reference to the drawings. In the drawings attached to the specification, a scale dimension, an aspect ratio and so on are changed and exaggerated from the actual ones, for the convenience of easiness in illustration and understanding.

In addition, terms used in the specification for specifying shapes, geometric conditions and their degrees, e.g., "parallel", "orthogonal", "same", etc., and values of a length and an angle are not limited to their strict definitions, but construed to include a range capable of exerting a similar function.

FIGS. 1 to 14 are views for explaining an embodiment. FIGS. 1 and 2D are a perspective view and a vertical sectional view showing a portable lighting device, respectively. FIGS. 3A, 4A, 4B and 4C show a state where a surface to be irradiated IP is lighted in a predetermined lighting pattern X by using the portable lighting device.

A portable lighting device 10 according to the present embodiment has a coherent light source 20, a shaping optical system 30 that shapes coherent light emitted from the coherent light source 20, and a diffractive optical element 40 that diffracts the coherent light shaped by the shaping optical system 30. In the portable lighting device 10, the diffractive optical element 40 diffracts coherent light to a surface and direct the coherent light to be irradiated IP. Thus, the surface to be irradiated IP can be lighted in a lighting pattern X depending on a diffraction pattern by the diffractive optical element 40. The use of the diffractive optical element 40 enables the surface to be irradiated IP to be accurately lighted in the desired lighting pattern X. The surface to be irradiated IP can be particularly irradiated with coherent light in the desired lighting pattern X with sharpened edges.

The portable lighting device 10 according to the present embodiment is sufficiently small and lightweight to be structured as a portable lighting device that can be carried. Thus, a user U can carry the portable lighting device 10 and can perform pattern-lighting at a desired place. Further, since the lighting device 10 is a sufficiently small and lightweight portable type, it may be effective to suitably change a surface to be irradiated IP which is to be irradiated with coherent light, from the point of view of display, eye catch, space production, depending on situations. A problem which arises when a surface to be irradiated IP with coherent light is changed have been found, and the portable lighting device 10 according to this embodiment is devised in on order to overcome this problem. To be specific, when a surface to be irradiated IP is changed, there arises a problem in that an orientation of a lighting pattern X also changes. In order to deal with this problem, the portable lighting device 10 is devised such that an orientation of a lighting pattern X on a surface to be irradiated IP is made to be adjustable. This makes it possible to pattern-light various surfaces to be irradiated IP at various places. Namely, the convenience unique to a portable lighting device can be enjoyed to significantly improve display visibility, eye catch property, space production effect, etc.

The aforementioned problem arises not only in a portable lighting device that is used by a person who holds it. The problem can also arise in a lighting device that is carried by a person to be installed on various apparatuses or buildings because the lighting device is small. When a lighting device is installed on a different position, a relative positional relationship between the lighting device and a surface to be irradiated may change. Namely, when a lighting device, which is small enough to be carried by a person, is used by being installed on something, a relative positional relationship between the lighting device and a surface to be irradiated may differ depending on an installing manner of the lighting device. In other words, the lighting device cannot maintain a constant relative positional relationship therebetween, and may cause the aforementioned problem. The "portable lighting device" used herein is not strictly limited to a lighting device that is actually carried upon use, and refers to a lighting device that is small enough to be carried, i.e., a lighting device that can be carried by a user.

Herebelow, the portable lighting device 10 is described with reference to illustrated specific examples.

As described above, the portable lighting device 10 has the coherent light source 20, the shaping optical system 30 and the diffractive optical element 40. In addition, the portable lighting device 10 has a casing 11 for housing the coherent light source 20, the shaping optical system 30 and the diffractive optical element 40. Further, the illustrated portable lighting device 10 has a switch 45, a power source 48, a control unit 50, a heat dissipating means 65, etc., as components for controlling emission and output etc. of coherent light as lighting light. The respective constituent elements of the portable lighting device 10 are described in sequence below.

The coherent light source 20 can emit coherent light having the same wavelengths and synchronized phases. Various types of light source is usable as the coherent light source 20. Typically, a laser light source that oscillates laser light can be used as the coherent light source 20. As a specific example, the illustrated coherent light source 20 is formed as a semiconductor laser light source, and is supported by a circuit board 22. In the example shown in FIG. 3, the coherent light source 20 includes a single light source. Thus, in the illustrated example, a surface to be irradiated IP is pattern-lighted with a color corresponding to a wavelength range of the coherent light oscillated from the coherent light source 20.

Note that the coherent light source 20 may include the coherent light sources 20. In this case, light emitted from the respective coherent light sources 20 may be superimposed and then directed toward the shaping optical system 30 and the diffractive optical element 40. As in a modification example shown in FIG. 6, coherent light emitted from the respective coherent light sources 20 may pass through shaping optical systems 30A, 30B, 30C and diffractive optical elements 40A, 40B, 40C, which are provided correspondingly to these coherent light sources 20, and may then be superposed on the surface to be irradiated IP. In such an example, the coherent light sources 20 included in the portable lighting device 10 may emit coherent light in the same wavelength range or may emit coherent light in different wavelength ranges from each other. When the portable lighting device 10 includes the coherent light sources 20 that emit light in the same wavelength range, the surface to be irradiated IP can be lighted brightly.

Figure 6:
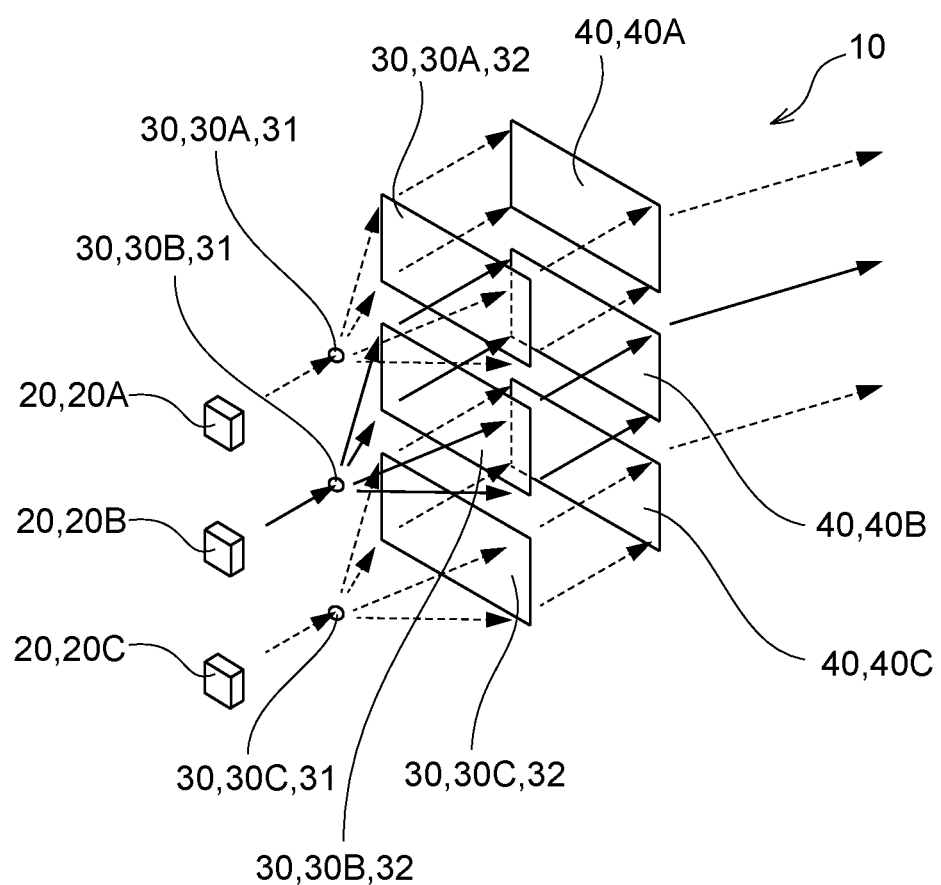
FIG. 6 is a perspective view showing a modification example of the portable lighting device correspondingly to FIG. 3A.

On the other hand, in the example shown in FIG. 6, the coherent light source 20 has a first coherent light source 20A, a second coherent light source 20B and a third coherent light source 20C which emit coherent light in different wavelength ranges from each other. A lighting color and brightness of the lighting pattern X on the surface to be irradiated IP may be controlled by adjusting emission of coherent light from the respective coherent light sources 20A to 20C, more specifically, emission and stop of light and emission output thereof.

The shaping optical system 30 shapes coherent light emitted from the coherent light source 20. In other words, the shaping optical system 30 shapes a sectional shape of coherent light orthogonal to an optical axis of the coherent light, and a three-dimensional shape of light bundle of coherent light. Typically, the shaping optical system 30 increases a light bundle sectional area of coherent light in a section orthogonal to an optical axis of the coherent light.

Figure 2A:
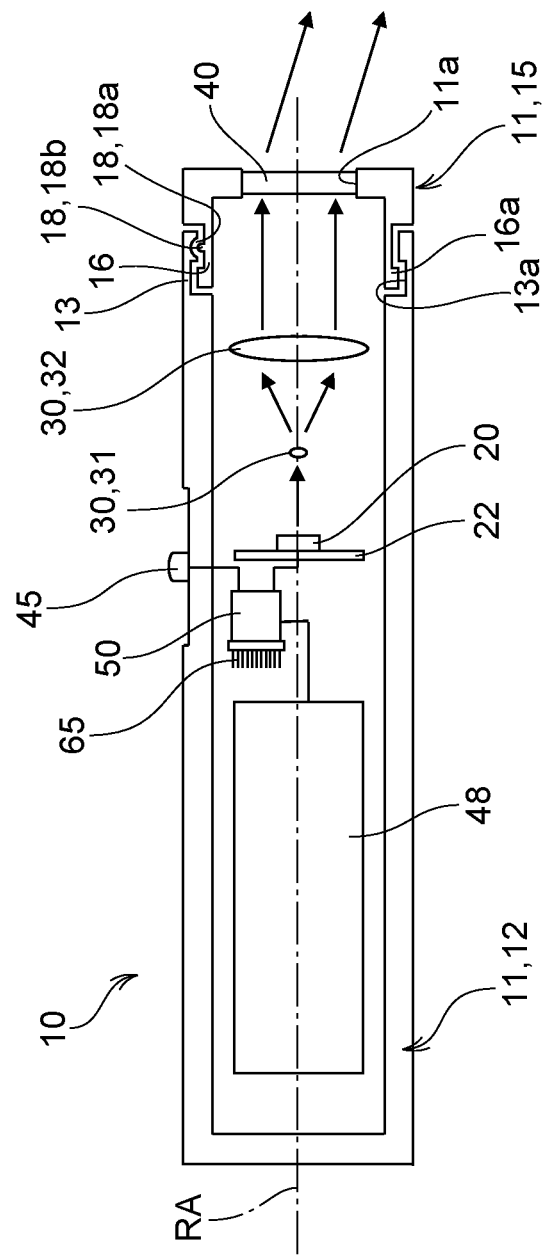
FIG. 2A is a vertical sectional view showing the portable lighting device of FIG. 1 along II-II line of FIG. 1.
Figure 3A:
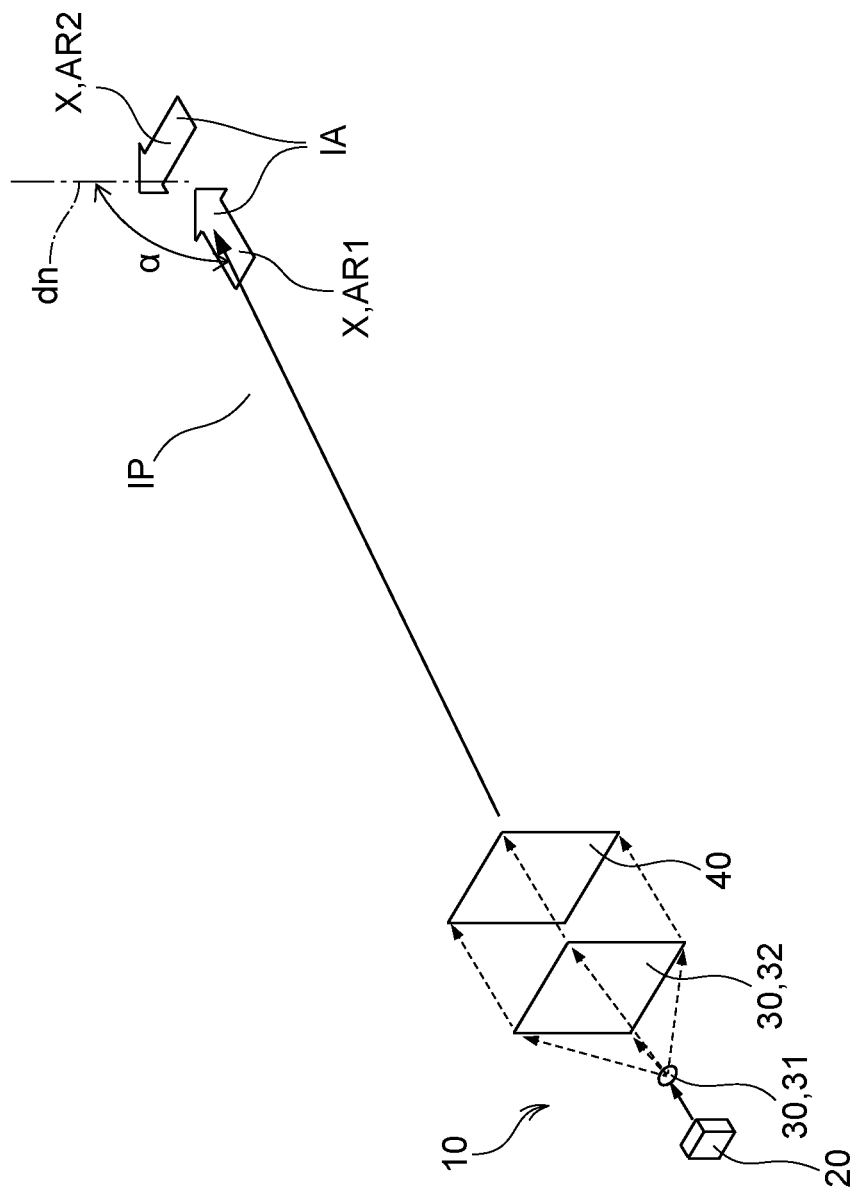
FIG. 3A is a perspective view for explaining an optical function of the portable lighting device of FIG. 1.

In the illustrated example, the shaping optical system 30 shapes coherent light emitted from the coherent light source 20 into widened parallel light bundle. Namely, the shaping optical system 30 functions as a collimating optical system. As shown in FIGS. 2A and 3A, the optical shaping system 30 has a first lens 31 and a second lens 32 in this order along an optical path of coherent light. The first lens 31 shapes coherent light emitted from the coherent light source 20 into divergent light bundle. The second lens 32 reshapes the divergent light bundle generated in the first lens 31 into parallel light bundle. Namely, the second lens 32 functions as a collimating lens.

In order for the diffraction optical element 40 to accurately diffract coherent light to a desired direction, it is important that an optical path of light incident on the diffractive optical element 40 corresponds to a predesigned optical path. Thus, since the optical path of the coherent light emitted from the coherent light source 20 is adjusted by the shaping optical system 30, the coherent light can be accurately projected onto a desired area on the surface to be irradiated IP.

In order that the coherent light can be accurately projected onto the surface to be irradiated IP, a parallelism of the coherent light shaped by the shaping optical system 30 is preferably ±0.3° or less, more preferably 0.1° or less, or further preferably 0.05° or less. Herein, the parallelism means a maximum angle that is defined by an optical path of light that travels in a plane passing through an optical axis of light bundle, with respect to a direction along which the light should be collimated. Thus, when the parallelism is ±0.3° or less, light traveling in a plane where the parallelism is measured travels within an angle range of 0.6°. The use of such a shaping optical system 30 enables the portable lighting device 10 to accurately irradiate a desired area on the surface to be irradiated IP with coherent light. An optical axis of light bundle is located on an optical path of light included in the light bundle where the highest luminous intensity is obtained.

From the viewpoint of improving the shaping accuracy of the shaping optical system 30, the shaping optical system 30 preferably includes at least one concave lens and at least one convex lens. In the example shown in FIGS. 2A and 3A, both the first lens 31 and the second lens 32 are formed as convex lenses, but any one of the first lens 31 and the second lens 32 may be a concave lens. Since a concave lens and a convex lens have opposite powers in the positive and negative directions, they alleviate influence of aberrations of each other. Namely, the combination of a concave lens and a convex lens can alleviate influence of aberration generated in these lenses. This makes it possible to further accurately project light onto a projection area. In the illustrated example, the shaping optical system 30 includes two lenses. However, not limited thereto, the shaping optical system 30 may include three or more lenses.

In place of the fact that the shaping optical system 30 includes a concave lens and a convex lens, the shaping optical system 30 may include an aspherical lens. When an aspherical lens including both a positive power portion and a negative power portion is used, influence of aberration generated in the lens can be alleviated. This makes it possible to further accurately project light onto a desired area on the surface to be irradiated IP.

A lens included in the shaping optical system 30 preferably has a non-circular shape, for example, a rectangular shape, when seen from an optical axis direction of the lens. The portable lighting device 10 can be made smaller and lighter, by trimming an unnecessary portion of a circular lens.

Next, the diffractive optical element 40 is described. The diffractive optical element 40 is an element that exerts a diffracting action on light emitted from the coherent light source 20. The diffractive optical element 40 diffracts light from the coherent light source 20 and directs it to the surface to be irradiated IP. Thus, as shown in FIG. 3A, the light diffracted by the diffractive optical element 40 is projected onto the surface to be irradiated IP, so that the surface to be irradiated IP is lighted in the lighting pattern X depending on a diffraction pattern of the diffraction optical element 40.

In the illustrated example, the lighting pattern X includes two arrows AR1, AR2 that point directions different from each other. The lighting pattern X is not particularly limited and may be a pattern displaying one or more of letter, picture, color pattern, symbol, mark, illustration, character and pictogram. The present embodiment is particularly suitable for a lighting pattern X indicating a direction or an orientation, because of its function of adjusting an orientation of a lighting pattern X.

The diffractive optical element 40 is typically a hologram element. When a hologram element is used as the diffractive optical element 40, diffraction characteristics of the diffractive optical element 40 can be easily designed. It is relatively easy to design a hologram element that can project coherent light only onto the entire desired area on the surface to be irradiated IP, the desired area having a predetermined size, a predetermined shape and a predetermined position. An area to be irradiated IA on the surface to be irradiated IP, which is irradiated with coherent light, determines a lighting pattern X on the surface to be irradiated IP.

When the diffractive optical element 40 is designed, the area to be irradiated IA having a predetermined size and a predetermined shape is set in a real space at a predetermined position with respect to the diffractive optical element 40. The position, size and shape of the area to be irradiated IA depend on the diffraction characteristics of the diffractive optical element 40. Thus, by adjusting the diffraction characteristics of the diffractive optical element 40, the position, size and shape of the area to be irradiated IA on the surface to be irradiated IP can be optionally adjusted. Namely, the lighting pattern X on the surface to be irradiated IP depends on a diffraction pattern of the diffractive optical element 40. Thus, when the diffractive optical element 40 is designed, a position, size and shape of the area to be irradiated IA may be determined first depending on a desired lighting pattern X, and the diffraction characteristics of the diffractive optical element 40 may be adjusted such that coherent light can be projected onto the entire determined area to be irradiated IA.

The diffractive optical element 40 can be produced as a computer generated hologram (CGH). A computer generated hologram can be produced by calculating a structure having given diffraction characteristics on a computer. Thus, when a computer generated hologram is adopted as the diffractive optical element 40, it is not necessary to generate object light and reference light using a coherent light source and an optical system, and to record interference fringes on a hologram recording material by exposure. As shown in FIG. 3A, for example, the portable lighting device 10 is expected to light the area to be irradiated IA having a predetermined size and a predetermined shape at a predetermined position with respect to the diffractive optical element 40. By inputting information related to the area to be irradiated IA as parameters to a computer, a structure having diffraction characteristics capable of lighting the area to be irradiated IA, e.g., an uneven surface can be specified by a computer calculation. When the specified structure is formed by resin shaping, for example, the diffractive optical element 40 as a computer generated hologram can be produced at low cost by a simple procedure.

When coherent light diffracted by the diffractive optical element 40 is applied to the area to be irradiated IA on the surface to be irradiated IP, the coherent light as lighting light generates the lighting pattern X corresponding to the area to be irradiated IA on the surface to be irradiated IP. In the example shown in FIG. 3A, there is no other optical elements between the diffractive optical element 40 and the surface to be irradiated IP. Thus, the light diffracted by the diffraction optical element 40 is directly incident on the surface to be irradiated IP. The diffracted light at each point on the diffractive optical element 40 is projected onto at least a part of the area to be irradiated IA on the surface to be irradiated IP. Namely, the diffracted light at each point on the diffractive optical element 40 travels within a predetermined diffusion angle range to be incident on the area to be irradiated IA on the surface to be irradiated IP.

An iterative Fourier transform method can be used for designing the diffractive optical element 40, for example. When the iterative Fourier transform method is used, a diffraction image on the area to be irradiated IA can be made as a Fraunhofer diffraction image, on the assumption that the area to be irradiated IA is distant from the diffractive optical element 40. Thus, when a normal direction dn of the surface to be irradiated IP is not parallel to a normal direction of a diffraction surface of the diffractive optical element 40, or even when the normal direction dn of the surface to be irradiated IP defines a large angle over 45° with respect to the normal direction of the diffractive optical element 40, the light intensity can be made uniform over the entire area of the area to be irradiated IA on the surface to be irradiated IP.

The portable lighting device 10 is used by a user U who holds it. From the viewpoint of laser safety, the diffractive optical element 40 forming an emergent surface of the portable lighting device 10 preferably has an area having ø8 mm or more.

Figure 3B:
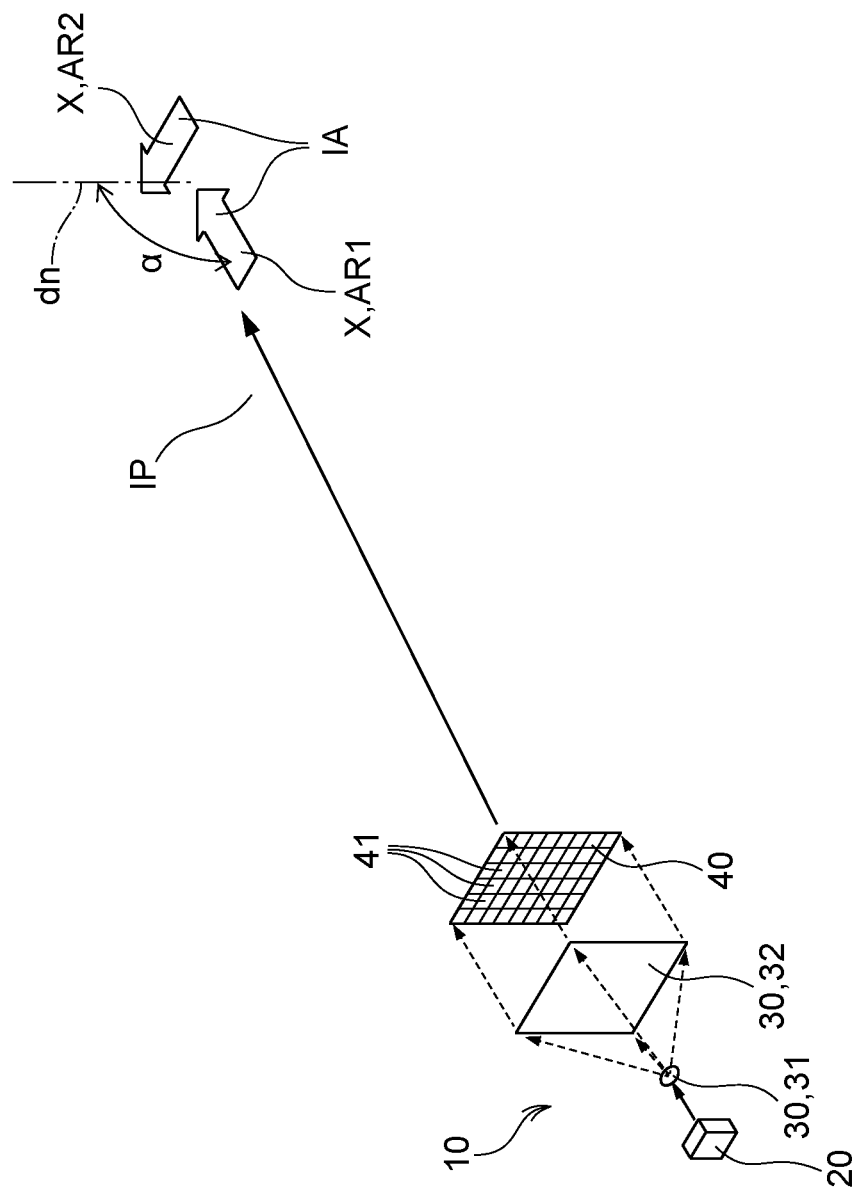
FIG. 3B is a view corresponding to FIG. 3A, which is a perspective view for explaining a modification example of a diffractive optical element included in the portable lighting device.

As shown in FIG. 3B, the diffractive optical element 40 may include diffractive optical subelements 41. Each diffractive optical subelement 41 is a hologram element, for example, and can be produced similarly to the aforementioned diffractive optical element. In the example shown in FIG. 3B, light diffracted by the respective diffractive optical subelements 41 is configured to be projected onto the same area as each other. Namely, coherent light diffracted by the respective diffractive optical subelements 41 is projected onto the entire area of the area to be irradiated IA set on the surface to be irradiated IP. Such a diffractive optical element 40 allows light toward respective positions in the area to be irradiated IA to dispersedly emerge from the diffractive optical subelements 41 included in the diffractive optical element 40. This effectively prevents the respective positions on the diffractive optical element 40 from becoming excessively bright, to thereby improve laser safety.

The respective diffractive optical elements 41 may be configured to have the same diffraction characteristics as each other. In order to achieve more accurate projection, each diffraction optical subelement 41 is preferably provided with diffraction characteristics designed individually based on a position at which this diffraction optical subelement 41 is arranged in the diffractive optical element 40. According to this example, each diffractive optical subelement 41 can accurately direct diffracted coherent light only to the entire area to be irradiated IA on the surface to be irradiated IP.

The present disclosure is not limited to a case in which the diffractive optical subelements 41 included in the diffractive optical element 40 allow coherent light to enter the same area as each other on the surface to be irradiated IP. For example, the diffractive optical subelements 41 may diffract coherent light on areas different from each other on the surface to be irradiated IP. Namely, coherent light diffracted by the diffractive optical subelements 41 may be incident on different sub-areas to be irradiated from each other on the surface to be irradiated IP. According to this example, combination of the sub-areas to be irradiated may form one area to be irradiated IA.

As an alternative example, coherent light diffracted by some of the diffractive optical subelements 41 may light a part of the area to be irradiated IA, and other diffractive optical subelements 41 may light another part of the area to be irradiated IA. To be more specific, in the illustrated example, some of the diffractive optical subelements 41 diffract coherent light only to an entire area corresponding to one arrow AR1 of the two arrows forming the lighting pattern X, and the remaining ones of the diffractive optical subelements 41 diffract coherent light only to an entire area corresponding to the other arrow AR2 of the two arrows forming the lighting pattern X.

Next, the casing 11 is described. The casing 11 has a size and shape that can be held by one hand so that the portable lighting device 10 is easy to carry. In the illustrated example, the portable lighting device 10 has a columnar outer shape as a whole. Thus, the illustrated portable lighting device 10 can be stably held by a user U who holds the casing 11 by one hand easily. Instead of the illustrated example in which the casing 11 is held, the casing 11 may be provided with a handle, and the user U may hold the portable lighting device 10 by holding the handle.

The casing 11 shown in FIG. 2A has a casing body 12 and a support body 15 connected to the casing body 12. The casing body 12 opens toward the support body 15. The casing body 12 has an outer tubular part 13 on an end thereof on the support body 15 side. An inner dimension, e.g., an internal diameter, of the casing body 12 becomes large in the outer tubular part 13. On the other hand, the support body 15 opens toward the casing body 12. The support body 15 has an inner tubular part 16 on an end thereof on the casing body 12 side. An outer dimension, e.g., an external diameter, of the support body 15 becomes small in the inner tubular part 16. The inner tubular part 16 of the support body 15 is inserted in the outer tubular part 13 of the casing body 12. Namely, the outer tubular part 13 of the casing body 12 encompasses and covers the inner tubular part 16 of the support body 15.

An inner surface of the outer tubular part 13 is provided with an annular recess 13a which extends annularly. An outer surface of the inner tubular part 16 is provided with a projection 16a that fits in the annular recess 13a. The projection 16a may extend annularly on the outer surface of the inner tubular part 16, or a plurality of the projections 16a may be circumferentially spaced apart from each other. Such a structure allows the support body 15 to be rotatable with respect to the casing body 12. A rotation axis line RA of the support body 15 with respect to the casing body 12 corresponds to center axis lines of the outer tubular part 13 and the inner tubular part 16. When the projection 16a and the annular recess 13a are engaged with each other, the relative movement of the support body 15 with respect to the casing body 12 is restricted, other than the relative rotation about the rotation axis RA.

In the portable lighting device 10 shown in FIG. 2A, the support body 15 holds the diffractive optical element 40. Namely, the diffractive optical element 40 is rotatably supported. An angular range within which the diffractive optical element 40 is rotatable may be 45° or more, preferably 90° or more, more preferably 180° or more, or further preferably 360°, or 360° or more. In the last case, the diffractive optical element 40 can be rotated without limitation.

For example, the support body 15 may hold an outer periphery of the diffractive optical element 40 along its entire length. In the illustrated example, the support body 15 has an opening 15a. The diffractive optical element 40 is held in the opening 15a. On the other hand, in the portable lighting device 10 shown in FIG. 2A, the coherent light source 20, the shaping optical system 30, the power source 48, the control unit 50, etc. are supported by the casing body 12. The coherent light source 20, the shaping optical system 30, the power source 48, the control unit 50, etc. are held in a hollow inside space of the casing body 12. Thus, when the support body 15 is rotated with respect to the casing 11, the diffractive optical element 40 is rotated with respect to the shaping optical system 30 and the coherent light source 20.

In the example shown in FIG. 2A, the rotation axis line RA of the support body 15 with respect to the casing body 12, i.e., the rotation axis line RA of the diffractive optical element 40 intersects with the diffractive optical element 40 held by the support body 15. The coherent light incident on the diffractive optical element 40 is configured to include coherent light incident on a position at which the rotation axis line RA of the diffractive optical element 40 and the diffractive optical element 40 intersect. Thus, coherent light is incident on the same diffractive optical element 40, before and after the rotation of the diffractive optical element 40 together with the rotation of the support body 15. Namely, the diffractive optical element 40 on which coherent light is incident can be the same, before and after the rotation of the diffractive optical element 40.

The rotation axis line RA of the support body 15 with respect to the casing body 12, i.e., the rotation axis line RA of the diffractive optical element 40 is not parallel to a direction orthogonal to an optical axis of the coherent light incident on the diffractive optical element 40. Particularly in the illustrated example, the rotation axis line RA is parallel to an optical axis of the coherent light incident on the diffractive optical element 40. Namely, in the illustrated example, the rotation axis line RA is parallel to a traveling direction of parallel light bundle which has been shaped by the shaping optical system 30 to be incident on the diffractive optical element 40. The coherent light incident on the diffractive optical element 40 includes coherent light that travels on the rotation axis line RA of the diffractive optical element 40 along the rotation axis line RA. Namely, when the support body 15 is rotated with respect to the casing body 12, an angle at which the coherent light is incident on the diffractive optical element 40 can be unchanged. In addition, if the rotation axis line RA shifts, a deviation of the incident angle of the coherent light can be suppressed slightly.

Particularly in the illustrated example, the rotation axis line RA of the support body 15 with respect to the casing body 12 is a direction perpendicular to the sheet-shaped diffractive optical element 40. Further, the rotation axis line RA of the support body 15 with respect to the casing body 12 is positioned on an optical axis of the coherent light incident on the diffractive optical element 40. Thus, irrespective of a rotated angle position of the support body 15 with respect to the casing body 12, the coherent light incident on the diffractive optical element 40 has a constant light bundle width. Further, when a spot area, which is an incident area of coherent light on the diffractive optical element 40, has a circular shape, coherent light can be allowed to be incident on a constant area of the diffractive optical element 40, irrespective of a rotated angle position of the support body 15 with respect to the casing body 12.

In addition, the casing 11 shown in FIG. 2A has a rotation restriction mechanism 18 for restricting free rotation of the support body 15 with respect to the casing body 12. To be specific, the casing body 12 has a first element 18a provided on the inner surface of the outer tubular part 13, and the support body 15 has a second element 18b provided on the outer surface of the support body 15. The first element 18a is formed as a recess, and the second element 18b is formed as a projection which can enter into the first element 18a. The first elements 18a and the second elements 18b are respectively spaced apart from each other about the rotation axis line RA. The support body 15 is held by the casing body 12 at a relative position where the first elements 18a and the second elements 18b are engaged with each other. Namely, the support body 15 is held at any of the relative positions with respect to the casing body 12, which is set by the arrangement of the first elements 18a and the second elements 18b. When a user applies a force for disengaging the first elements 18a and the second elements 18b from each other, and relatively rotates the support body 15 with respect to the casing body 12, the support body 15 can be moved to a different relative position with respect to the casing body 12. In accordance therewith, the diffractive optical element 40 is rotated and is then held at any of relative positions which are preset with respect to the coherent light source 20 and the shaping optical system 30.

As shown in FIG. 1, the casing 11 is provided with a mark 19 for showing a rotated position of the support body 15 with respect to the casing body 12. In the illustrated example, marks 19 are provided on both the casing body 12 and the support body 15. In the illustrated example, the marks 19 are provided correspondingly to the first elements 18a and the second elements 18b. Thus, the support body 15 is fixed with respect to the casing body 12, in a state where one of the marks 19 provided on the support body 15 and one of the marks 19 provided on the casing body 12 are located at the same position along the circumferential direction about the rotation axis line RA.

As shown in FIGS. 1 and 2A, the casing 11 is provided with a switch 45. The power source 48 and the control unit 50 are housed in the casing 11. The portable lighting device 10 is portable, and the power source 48 may be a dry battery or a rechargeable battery. The power source 48 supplies power to drive the coherent light source 20. The control unit 50 controls emission of coherent light from the portable lighting device 10 based on operation, etc. of the switch 45 by the user U. To be more specific, the control unit 50 controls the emission of coherent light from the portable lighting device 10 by regulating the electric power supplied to the coherent light source 20, the electric energy supplied to the coherent light source 20, conditions of driving the coherent light source 20, etc. Such a control unit 50 can be formed as an electric circuit. In this example, the control unit 50 may include a circuit board.

The switch 45 is exposed to the outer surface of the casing 11. In the illustrated example, the switch 45 is provided at a position on the columnar side surface of the columnar casing 11. Thus, the switch 45 is provided at a position apart from the rotation axis line RA and displaced from the rotation axis line RA. The switch 45 is operated when the emission of coherent light from the portable lighting device 10 is switched on/off, for example. In the illustrated example, the switch 45 for controlling the portable lighting device 10 is provided on the casing body 12 of the casing 11. The casing body 12 is a part held by a user U. Thus, when the support body 15 is rotated together with the diffractive optical element 40, the switch 45 is not moved. As a result, a user can operate the switch 45 while keeping the portable lighting device 10 as it is.

The portable lighting device 10 further comprises a heat dissipating means 65 that promotes dissipation of heat from the control unit 50. In the example shown in FIG. 2A, the heat dissipating means 65 is formed as a heat sink made of an excellent conductive material, such as aluminum. The heat dissipating means 65 is fixed to the control unit 50. The heat dissipating means 65 absorbs heat from the control unit 50 and dissipates heat. the casing 11 may be provided with an opening for dissipating heat at a position facing the heat dissipating means 65. In addition, the coherent light source 20 and/or the circuit board 22 may be provided with heat dissipating means so as to promote dissipation of heat from the coherent light source 20 and/or the circuit board 22.

The portable lighting device 10 may have its total length in a direction along the rotation axis line RA. The total length of the portable lighting device 10 may be 100 mm or more and 300 mm or less, for example. In addition, the portable lighting device 10 may have, for example, a quadrangular shape having a side of 15 mm or more and 55 mm or less, or a circular shape having a diameter of 15 mm or more and 55 mm or less, in a direction orthogonal to the rotation axis line RA. Further, the diffractive optical element 40 may have a quadrangular shape having a side of 10 mm or more and 50 mm or less.

Next, an operation of the aforementioned portable lighting device 10 is described.

When a user U operates the switch 45, the portable lighting device 10 emits lighting light which is coherent light. The switch 45 is provided on the outer circumferential surface of the casing 11 having an elongated columnar outer shape. The user U can operate the switch 45 by his/her hand which is holding the portable lighting device 10. Since it is easy to operate the portable lighting device 10, the user U who holds the portable lighting device 10 can operate and use the portable lighting device 10 stably.

When the switch 45 is operated, the control unit 50 supplies power from the power source 48 to the coherent light source 20. Thus, the laser oscillator serving as the coherent light source 20 is driven so that coherent light is emitted from the coherent light source 20. As shown in FIGS. 2A and 3A, the coherent light emitted from the coherent light source 20 enters the shaping optical system 30 first. The shaping optical system 30 expands the light emitted from the coherent light source 20. Namely, the shaping optical system 30 shapes the light such that an area occupied by the coherent light spreads in a section orthogonal to the optical axis. The shaping optical system 30 has the first lens 31 and the second lens 32. As shown in FIG. 2A, the first lens 31 of the shaping optical system 30 diffuses the coherent light emitted from the coherent light source 20 to divergent light bundle. Then, the second lens 32 of the shaping optical system 30 collimates the divergent light bundle to parallel light bundle.

Figure 4B:
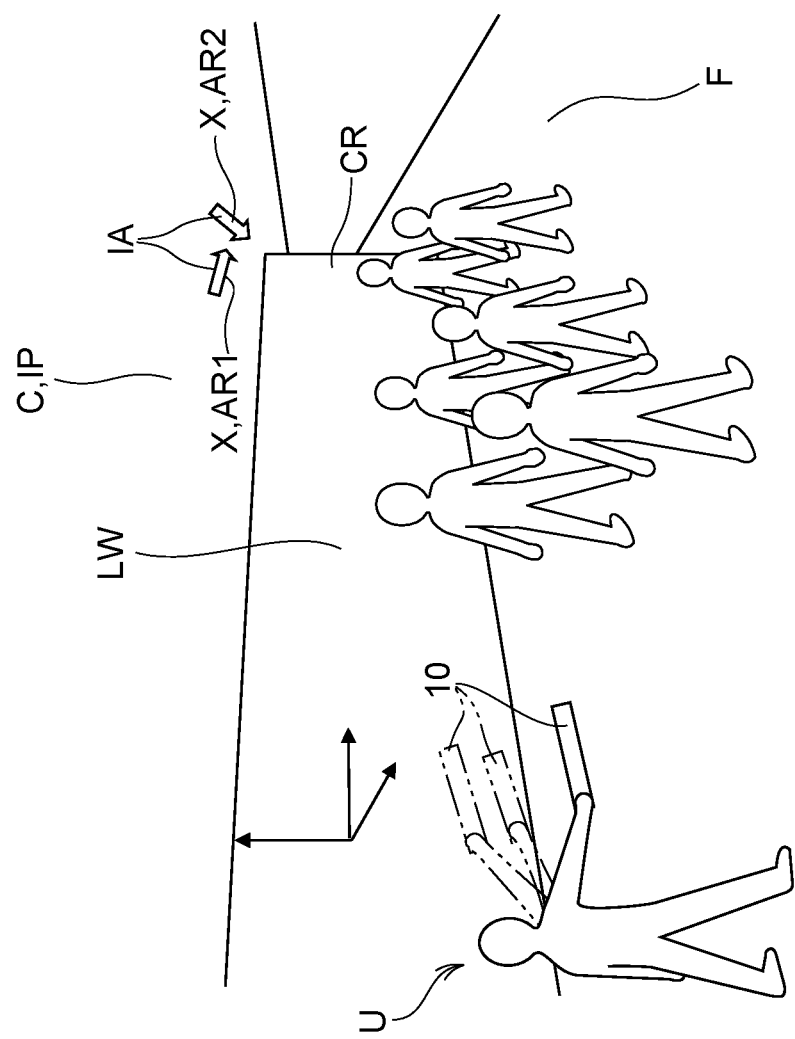
FIG. 4B is a view corresponding to FIG. 4A, which is a perspective view for explaining the use manner of the portable lighting device of FIG. 1.
Figure 4C:
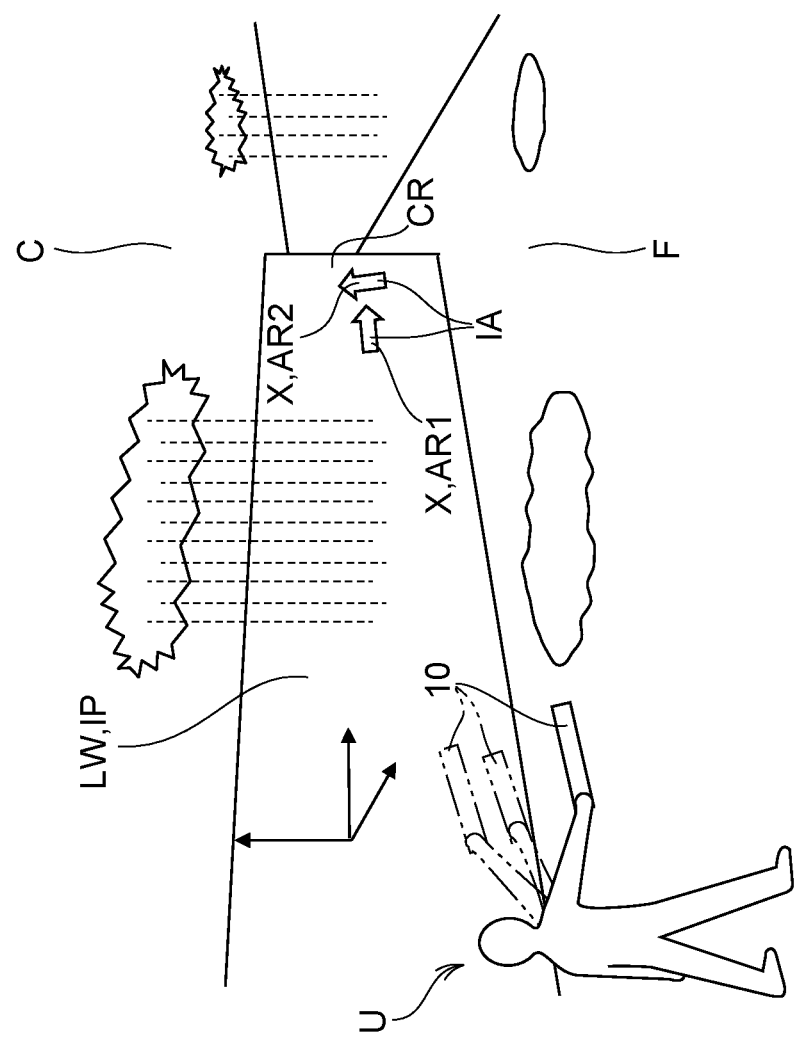
FIG. 4C is a view corresponding to FIG. 4A, which is a perspective view for explaining the use manner of the portable lighting device of FIG. 1.

The coherent light shaped by the shaping optical system 30 then travels to the diffractive optical element 40. The diffractive optical element 40 diffracts the coherent light from the shaping optical system 30. The coherent light diffracted by the diffractive optical element 40 emerges from the portable lighting device 10. At this time, as shown in FIGS. 4A, 4B and 4C, the user U holds the portable lighting device 10 such that the diffractive optical element 40, which serves as an emergent surface of the portable lighting device 10, faces the surface to be irradiated IP. Since the diffraction characteristics of the diffractive optical element 40 are designed in consideration of the relationship between the diffractive optical element 40 and the surface to be irradiated IP, the light diffracted by the diffractive optical element 40 is directed, as lighting light from the portable lighting device 10, to the intended area to be irradiated IA on the surface to be irradiated IP. Thus, the area to be irradiated IA having a pattern corresponding to the diffraction pattern of the diffraction optical element 40 is irradiated with the coherent light. In this manner, the portable lighting device 10 can light the surface to be irradiated IP in the lighting pattern X corresponding to the diffraction pattern of the diffractive optical element 40.

In the specific examples shown in FIGS. 3A, 4A, 4B and 4C, a floor F or a ground surface is irradiated with the lighting pattern X including a forward arrow AR1 and a leftward arrow AR2 positioned in front of the forward arrow AR1. The lighting by the portable lighting device 10 can display a direction or an orientation in a building such as a school, a company, a factory, a meetinghouse, an auditorium, a gymnasium, a stadium, a hall, and outdoors such as a road, a sea, a lake, etc., shown in FIGS. 4A, 4B and 4C. For example, the illustrated lighting pattern X can display a path that goes straight and then turns to the left.

Figure 16:
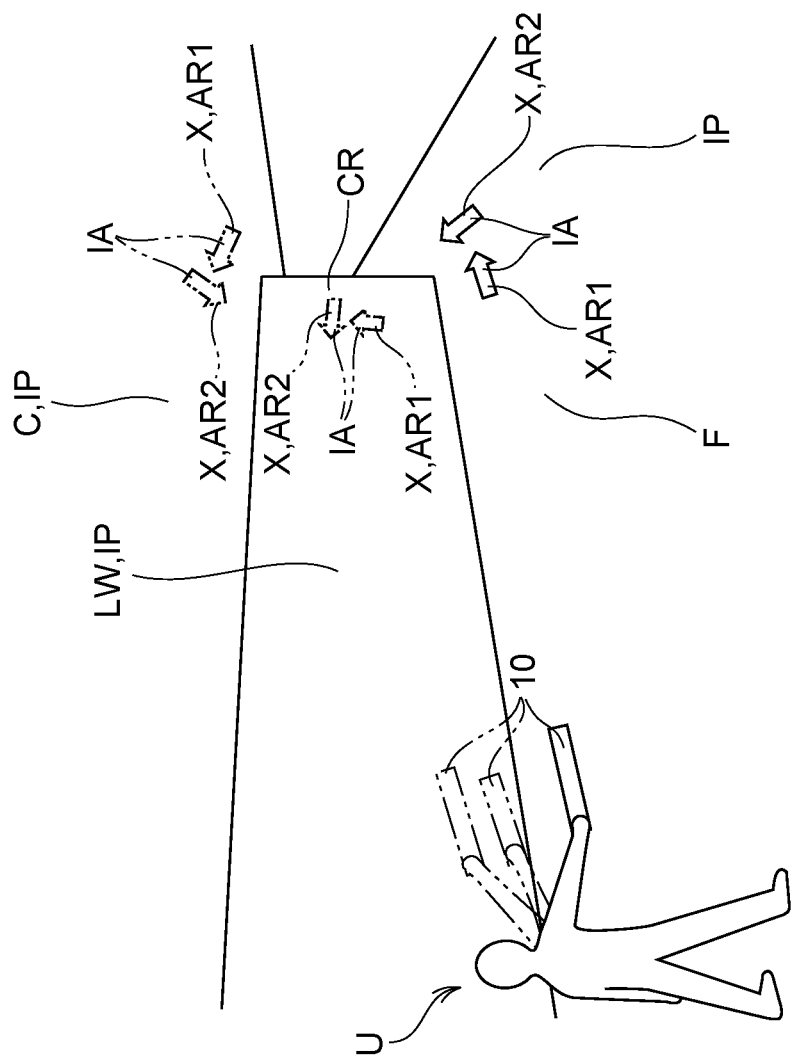
FIG. 16 is a view corresponding to FIG. 4A, which is a side view for explaining a problem of a portable lighting device which is not devised as in the present embodiment.

The terms indicating directions or orientations such as "front", "rear", "left" and the like used with reference to FIG. 4A and below-described FIGS. 4B, 4C and 16 related to FIG. 4A are based on the user U shown in FIGS. 4A, 4B, 4C and 16, who looks at a corner CR in FIGS. 4A, 4B, 4C and 16.

The portable lighting device 10 is particularly convenient when the area to be irradiated IA on the surface to be irradiated IP on which coherent light is projected from the portable lighting device 10 is far away from the diffractive optical element 40 serving as the emergent surface of the portable lighting device 10. Namely, the portable lighting device 10 is convenient when it indicates a direction or an orientation by the lighting pattern X at a position far away from the user U of the portable lighting device 10. In this case, an incident angle α of the coherent light, which is irradiated from the portable lighting device 10 to each position in the area to be irradiated IA, is very large. Such an incident angle α may be almost 90°. Herein, an incident angle α on the area to be irradiated IA is an angle defined by a traveling direction of incident light with respect to the normal direction do of the area to be irradiated IA. Simultaneously, the diffractive optical element 40 serving as the emergent surface of the portable lighting device 10 defines a large angle with respect to the surface to be irradiated IP. An inclination angle between the surfaces can be evaluated by a value of an angle defined by the normal directions to respective surfaces.

On the other hand, in the aforementioned portable lighting device 10 in the present embodiment, an optical path of coherent light is adjusted by the diffractive optical element 40. The optical-path adjusting function of the diffractive optical element 40 is generally accurate. Thus, the diffractive optical element 40 can adjust an optical path of coherent light toward the area to be irradiated IA on the surface to be irradiated IP corresponding to the desired lighting pattern X. For example, an area to be irradiated IA which is far away from the portable lighting device 10, and an area to be irradiated IA on the surface to be irradiated IP, on which lighting light is incident at a large incident angle α, can be irradiated with coherent light accurately, and an intended lighting pattern X can be clearly displayed thereon. Thus, the portable lighting device 10 can be taken to various places to pattern-light a surface to be irradiated IP. For example, the portable lighting device 10 having the aforementioned structure can accurately light an area to be irradiated IA which is away from the portable lighting device 10 by a distance of 4 m or more and 50 m or less, preferably an area to be irradiated IA which is away from the portable lighting device 10 by a distance of 10 m or more and 20 m or less.

When the portable lighting device 10 is used, it may be preferable that a wall LW or a ceiling C is pattern-lighted, in place of a ground surface or a floor F. For example, in the state shown in FIG. 4A, when the road is crowded, it is assumed that the lighting pattern X cannot displayed on the floor F because the lighting light is blocked by pedestrians. In this case, it is advantageous to use, in place of the floor F, a ceiling C as the surface to be irradiated IP, so that the lighting pattern X is displayed on the ceiling C. As a specific example, as shown in FIG. 4B, when a large number of people are to be guided simultaneously and urgently, such as an event with many people or a large-scale disaster, etc. the surface to be irradiated (floor F, ground surface, wall, etc.), which is initially intended in the use of the portable lighting device 10, could be blocked by people or the like and could not be used. In the example shown in FIG. 4B, the ceiling C is used as the surface to be irradiated IP, whereby the lighting pattern X can be irradiated from the portable lighting device 10 without being blocked. Further, in the case of an accident or a disaster, the ceiling C, the floor F and the wall LW may be broken. In this case, the broken ceiling C, the floor F and the wall LW could not be effectively used as the surface to be irradiated IP. In the example shown in FIG. 4C, the ceiling C is broken and water leaks therefrom, as well as the floor F is flooded. In the example shown in FIG. 4C, the wall LW is used as the surface to be irradiated IP.

Further, a surface suitable to be used as the surface to be irradiated IP changes depending on a position of a viewer who looks at the lighting pattern X. In the example shown in FIG. 4A, for example, it is easier for a viewer, who is positioned on the right side in FIG. 4A, to look at the lighting pattern X displayed on the wall LW than to look at the lighting pattern X displayed on the floor F. As another example, it would be preferable to change the surface to be irradiated IP not only for the visibility of the lighting pattern X but also for other situations. Namely, another surface to be irradiated IP may be preferred with a view to improving eye catch property and space production effect.

The request of changing the surface to be irradiated IP results from the fact that the lighting device 10 is portable so that a direction and an orientation of the portable lighting device 10 itself can be easily and freely changed. Namely, such a request is more conspicuous in the portable lighting device 10.

Figure 15:
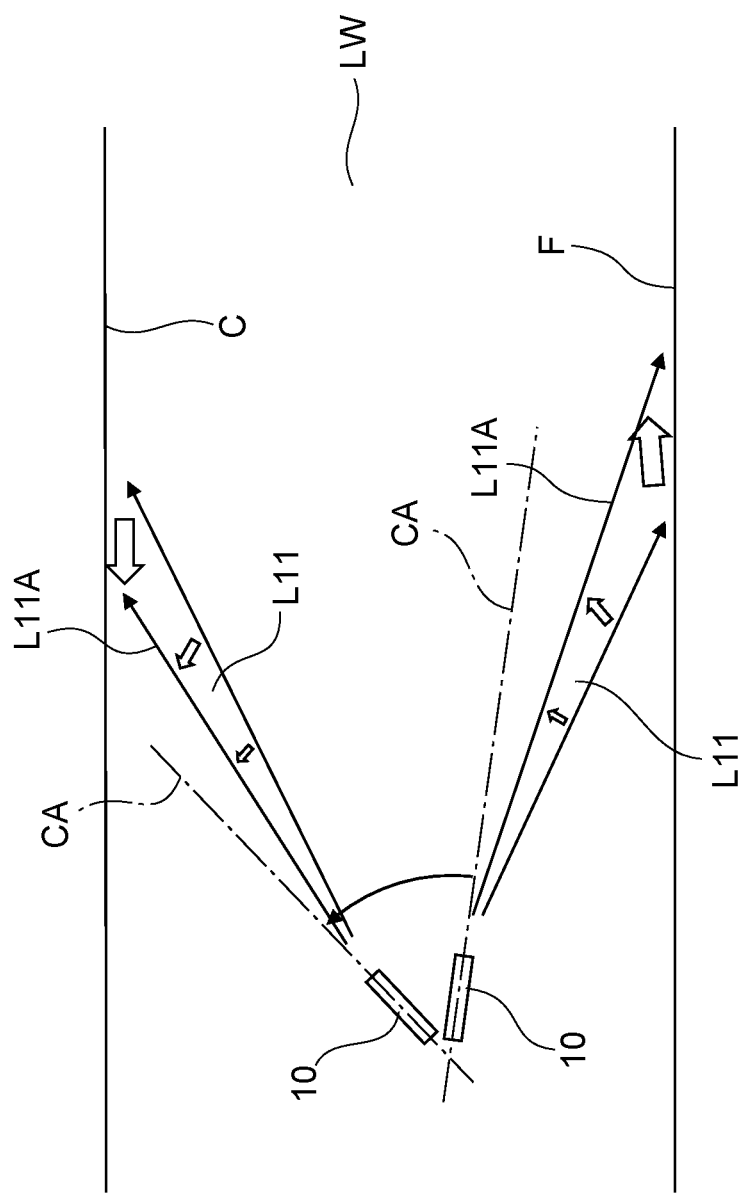
FIG. 15 is a perspective view for explaining a problem of a portable lighting device which is not devised as in the present embodiment.

However, on the other hand, a diffraction pattern of a diffractive optical element is designed on the assumption that the diffractive optical element and a surface to be irradiated have a constant positional relationship. Thus, as shown in FIG. 15, when the orientation of the portable lighting device 10 facing the floor F is merely changed so that it faces the ceiling C, the orientation of the lighting pattern X is undesirably changed. In the example shown in FIG. 15, lighting light L11 advances slightly below a center axis line CA of the elongate portable lighting device 10. Light L11A of the lighting light L11, which is near the center axis line CA, forms a distal end side of an arrow as a display pattern. Thus, when the orientation of the portable lighting device 10 is merely changed, the arrow functioning as a display pattern displayed on the ceiling C is oriented oppositely to the arrow functioning as a display pattern displayed on the floor F.

For example, in the example shown in FIG. 4A, the two arrows AR1 and AR2 are displayed as the lighting pattern X on the floor F. When the orientation of the portable lighting device 10 is changed so that it faces the ceiling C, as shown in FIG. 16, a leftward arrow AR2 and a rearward arrow AR1, which is positioned behind the leftward arrow AR2, are displayed on the ceiling C. Similarly, as shown in FIG. 16, when the orientation of the portable lighting device 10 is changed so that it faces the left wall LW, a rearward arrow AR2 and an upward AR1, which is positioned below the leftward arrow AR2, are displayed on the left wall LW. As apparent from FIG. 16, when the orientation of the potable lighting device 10 is merely changed, the lighting pattern X points an unintended orientation, because the orientation of the surface to be irradiated IP with respect to the diffractive optical element 40 of the portable lighting device 10 is changed. In particular, when the lighting pattern X displays a direction or an orientation, an unintended direction or orientation is displayed.

Figure 5A:
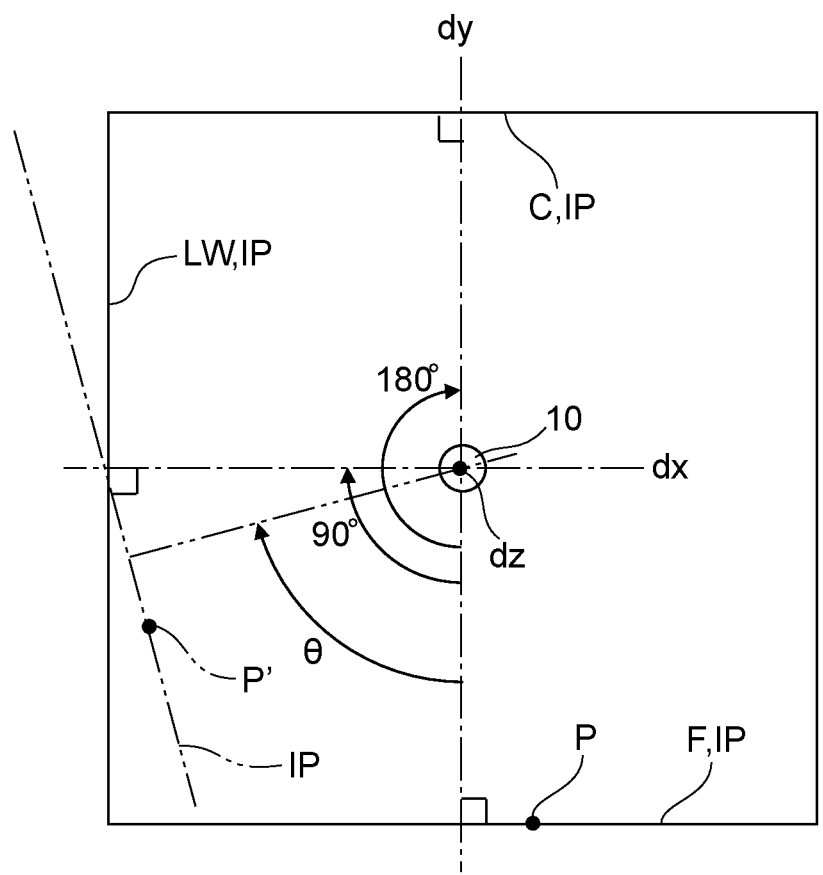
FIG. 5A is a plan view for explaining the relationship between the portable lighting device and a surface to be irradiated in the use manner shown in FIG. 4A.
Figure 5B:
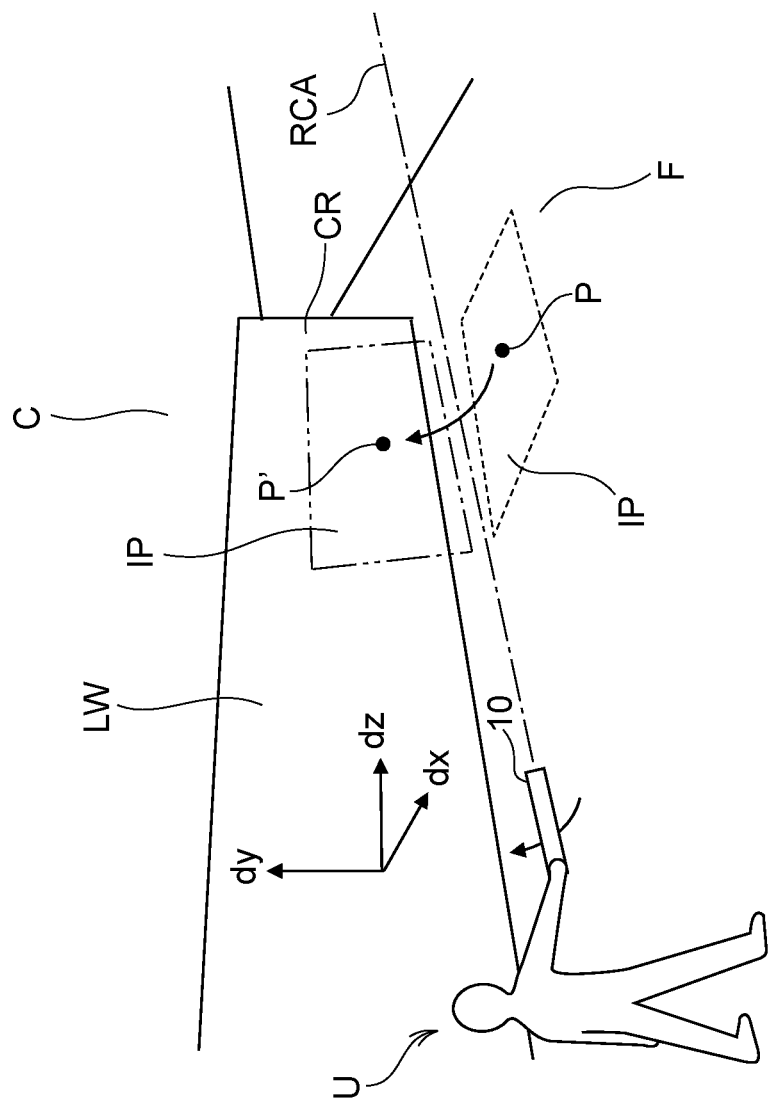
FIG. 5B is a perspective view for explaining a change in the surface to be irradiated and an area to be irradiated in the use manner showing in FIG. 4A.

In the portable lighting device 10 in the present embodiment, the diffractive optical element 40 is rotatably supported in order to deal with such a problem. According to the present embodiment, as shown in FIG. 5A, an orientation of the area to be irradiated IA can be adjusted by rotating the diffractive optical element 40 when an orientation of the surface to be irradiated IP with respect to the portable lighting device 10 including the diffractive optical element 40 is changed. FIG. 5A shows an environment where the portable lighting device 10 is used shown in FIG. 4A, with a field of view of the user U who looks at the corner CR. FIG. 5B is a perspective view.

In FIGS. 5A and 5B, a dz axis is set as a direction along which a viewer looks at a lighting pattern, which is a direction along the floor F and the wall LW, a dx axis is set as the horizontal direction, and a dy axis is defined as the vertical direction. An origin is set at a position of the portable lighting device 10. In this axis of coordinate set as above, each position P $(x_n, y_n, z_n)$ on the surface to be irradiated IP lighted by the portable lighting device 10 moves to a position P', when the portable lighting device 10 is rotated by an angle θ about a rotation center axis line RCA parallel to the dz axis. The coordinate of the position P' is expressed as follows.

$$P'(x_n\times(\cos\theta)+y_n\times(-\sin\theta), x_n\times(\sin\theta)+y_n\times(\cos\theta), z_n)$$

An orientation of the floor F with respect to the portable lighting device 10 including the diffractive optical element 40 is vertically downward. An orientation of the ceiling C with respect to the portable lighting device 10 is vertically upward. The orientation of the ceiling C with respect to the portable lighting device 10 is rotated in the clockwise direction by 180° from the orientation of the floor F with respect to the portable lighting device 10. Thus, when the portable lighting device 10 according to the present embodiment is used, the diffractive optical element 40 is rotated in the clockwise direction by 180°. In the illustrated specific example, the user U rotates the support body 15 holding the diffractive optical element 40 in the clockwise direction by 180° with respect to the casing body 12. After he/she has rotated the diffractive optical element 40 in this manner, the user U adjusts the orientation of the portable lighting device 10 somewhat in the up and down direction to light the ceiling C as the surface to be irradiated IP. This adjustment is extremely intuitive because the user U can adjust the orientation of the portable lighting device 10 while checking the lighting pattern X displayed on the ceiling C. In this case, as shown in FIG. 4A, the lighting pattern X can be displayed on the ceiling C to point the same orientation as that of the lighting pattern X which was displayed on the floor F before the rotation of the diffractive optical element 40.

Next, the left wall LW is considered. An orientation of the left wall LW with respect to the portable lighting device 10 is horizontally leftward. The orientation of the left wall LW with respect to the portable lighting device 10 is rotated in the clockwise direction by 90° from the orientation of the floor F with respect to the portable lighting device 10. Thus, when the portable lighting device 10 according to the present embodiment is used, the diffractive optical element 40 is rotated in the clockwise direction by 90°. In the illustrated specific example, the user U rotates the support body 15 holding the diffractive optical element 40 in the clockwise direction by 90° with respect to the casing body 12. After he/she has rotated the diffractive optical element 40 in this manner, the user U adjusts the orientation of the portable lighting device 10 somewhat in the right and left direction to light the left wall W as the surface to be irradiated IP. In this case, as shown in FIG. 4A, the lighting pattern X can be displayed on the left side to point the same orientation as that of the lighting pattern X which was displayed on the floor F before the rotation of the diffractive optical element 40.

In this manner, the orientation of the lighting pattern X on the surface to be irradiated IP can be adjusted by the simple operation, i.e., by rotating the diffractive optical element 40 and adjusting the orientation of the portable lighting device 10 held by the user. Thus, also under an urgent situation such as evacuation guidance or the like upon a disaster, an accident, an incident, etc., the portable lighting device 10 can be effectively used to appropriately project a lighting pattern X onto a surface to be irradiated IP such that the lighting pattern X points a desired direction.

Figure 11:
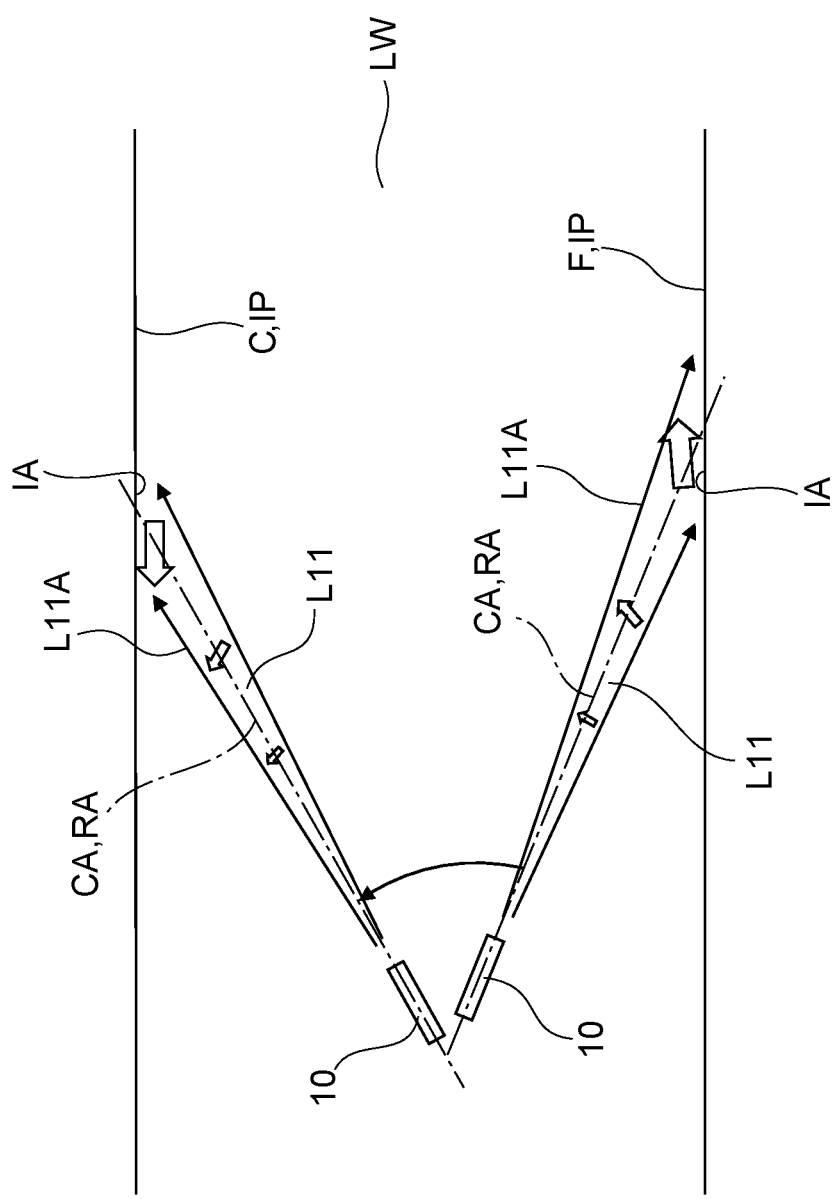
FIG. 11 is a view for explaining further another modification example of the portable lighting device.

As shown in FIG. 15, for example, the above description shows an example in which the center axis line CA of the portable lighting device 10 defined by the casing body 12, for example, is slightly displaced from the area to be irradiated IA on the surface to be irradiated IR However, the present disclosure is not limited to this example. As shown in FIG. 11, the center axis line CA of the portable lighting device 10 may be positioned within the area to be irradiated IA on the surface to be irradiated IP. In other words, as shown in FIG. 11, a position at which the center axis line CA of the portable lighting device 10 intersects with the surface to be irradiated IP may be positioned within the area to be irradiated IA on the surface to be irradiated IP, on which the coherent light diffracted by the diffractive optical element 40 is incident. Similarly, a position at which the rotation axis line RA of the diffractive optical element 40 intersects with the surface to be irradiated IP may be positioned within the area to be irradiated IA on the surface to be irradiated IP, on which the coherent light diffracted by the diffractive optical element 40 is incident. Further, an incident position of $0^{th}$-order light advancing from the diffractive optical element 40 is within an incident area of the coherent light diffracted by the diffractive optical element 40 on the surface to be irradiated IP. When the diffractive optical element 40 is adjusted as described above, a user U can display a lighting pattern X on a desired area extremely intuitively, just by pointing the distal end of the portable lighting device 10 to the desired area.

In the aforementioned example, the diffractive optical element 40 is rotated correspondingly to the change from the orientation of the surface to be irradiated IP, which is a default orientation when the diffractive optical element 40 was designed, to the orientation of the surface to be irradiated IP, which is to be actually lighted. In this case, the lighting patterns X pointing the same orientation can be displayed on different surfaces to be irradiated IP. Note that the diffractive optical element 40 may be rotated at an angle different from an amount of the change from the default orientation of the surface to be irradiated IP to the orientation of the surface to be irradiated IP to be actually used for lighting, in order to intentionally display a lighting pattern X pointing a different orientation on a different surface to be irradiated IP. There is a possibility that the orientation of a lighting pattern X is intentionally changed depending on use and/or the lighting pattern X.

Figure 2B:
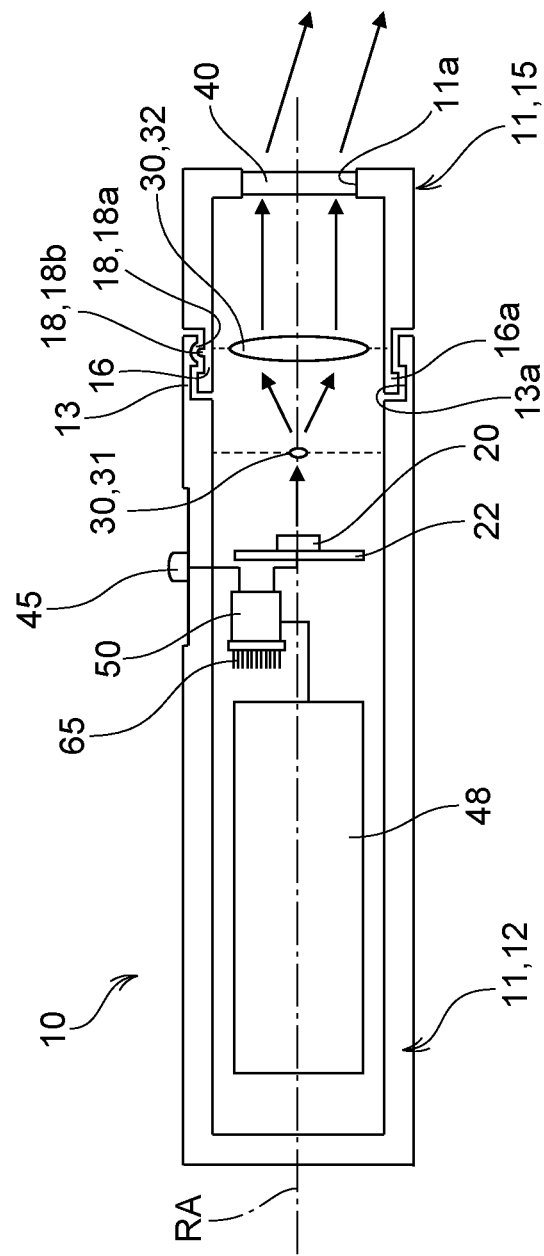
FIG. 2B is a view corresponding to FIG. 2A, which is a vertical sectional view for explaining a modification example of a casing included in the portable lighting device of FIG. 1.
Figure 2C:
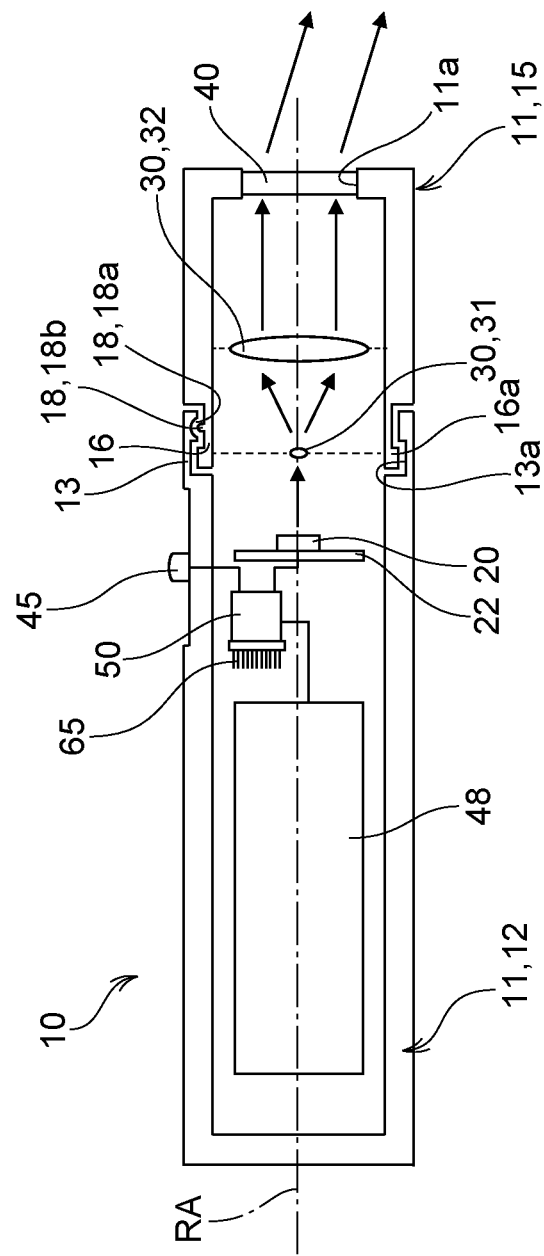
FIG. 2C is a view corresponding to FIG. 2A, which is a vertical sectional view for explaining another modification example of a casing included in the portable lighting device of FIG. 1.

Further, FIG. 2A shows the example in which the support body 15 supports only the diffractive optical element 40, and the casing body 12 supports the coherent light source 20, the shaping optical system 30, etc. However, the present disclosure is not limited to this example. For example, as shown in FIG. 2B, the support body 15 may support the diffractive optical element 40 and a part (second lens 32) of the shaping optical system 30, and the casing body 12 may support the remaining part (first lens 31) of the shaping optical system 30, the coherent light source 20, etc. Alternatively, as shown in FIG. 2C, the support body 15 may support the diffractive optical element 40 and the shaping optical system 30, and the casing body 12 may support the light source 20, etc. Further, the support body 15 may support all the coherent light source 20, the shaping optical system 30 and the diffractive optical element 40. Also in these examples, an orientation of a lighting pattern X can be adjusted by rotating the support body 15 with respect to the casing body 12, when an orientation of a surface to be irradiated IP is changed.

According to the aforementioned embodiment, in the portable lighting device 10 that lights a surface to be irradiated IP in a lighting pattern X depending on a diffraction pattern of the diffractive optical element 40, the diffractive optical element 40 is rotatably supported. Thus, a relationship between an orientation of the diffractive optical element 40 and a surface to be irradiated IP can be adjusted by rotating the diffractive optical element 40 depending on the orientation of the surface to be irradiated IP with respect to the portable lighting device 10. Namely, the orientation of the diffractive optical element 40 can be adjusted such that the diffractive optical element 40 is appropriately oriented with respect to the surface to be irradiated IP. Thus, the surface to be irradiated IP can be lighted in a desired lighting pattern X. As a result, a user U carrying the portable lighting device 10 can pattern-light a surface to be irradiated IP suitable for conditions in various places. Namely, this embodiment can remarkably improve the convenience of a portable lighting device 10.

In one specific example of the aforementioned embodiment, the diffractive optical element 40 is supported to be relatively rotatable with respect to the shaping optical system 30. In such a portable lighting device 10, a rotatably supported portion of the portable lighting device 10 can be made small. This reduces the burden on a user U when he/she rotates the diffractive optical element 40, so that the user U can smoothly rotate the diffractive optical element 40.

In one specific example of the aforementioned embodiment, the diffractive optical element 40 is supported to be rotatable about the rotation axis line RA parallel to an optical axis of the coherent light incident on the diffractive optical element 40. In such a portable lighting device 10, changes in conditions of coherent light incident on the diffractive optical element 40 caused by rotation of the diffractive optical element 40 can be effectively suppressed. Thus, a surface to be irradiated IP can be accurately lighted in a desired lighting pattern X.

In one specific example of the aforementioned embodiment, the diffractive optical element 40 is held at any of the preset positions. In such a portable lighting device 10, it is easy to rotate the diffractive optical element 40, and a surface to be irradiated IP in a predetermined orientation can be accurately pattern-lighted. Such a specific example is suitable for a portable lighting device 10 that pattern-lights any one of preset surfaces to be irradiated IP on which pattern-lighting is to be performed.

In one specific example of the aforementioned embodiment, the portable lighting device 10 further comprises the casing 11 having the casing body 12 that supports the coherent light source 20, and the support body 15 that supports the diffractive optical element 40 and is rotatable with respect to the casing body 12. In such a portable lighting device 10, the coherent light source 20 is supported by the casing body 12 which does not need to be rotated. Thus, the power source 48 and the control unit 50, which are provided in connection with the coherent light source 20, can be supported by the casing body 12. On the other hand, the support body 15 supporting the diffractive optical element 40 can be made small and light. This reduces the burden on a user U when he/she rotates the diffractive optical element 40, so that the user U can smoothly rotate the diffractive optical element 40.

In one specific example of the aforementioned embodiment, the switch 45 which controls emission of coherent light in the portable lighting device 10, for example, is provided on the casing body 12. In such a portable lighting device 10, it is not necessary to rotate the switch 45 when the diffractive optical element 40 is rotated. Namely, the switch 45 is provided on the casing body 12 which is held by a user U and is maintained stationally with respect to the rotated support body 15. Thus, it is easy to operate the switch 45. Such a specific example is particularly suitable for a lighting device 10 which is portable.

In particular, the switch 45 is provided at a position apart from, in other words, displaced from the rotation axis line RA of the control unit 50. In such a portable lighting device 10, if the switch 45 is rotated together with the diffractive optical element 40, the position of the switch 45 is significantly moved. Thus, in the portable lighting device 10 in which the switch 45 is apart from the rotation axis line RA of the diffractive optical element 40, it is particularly effective that the switch 45 is provided on the casing body 12.

In one specific example of the aforementioned embodiment, the portable lighting device 10 further comprises the heat dissipating means 65 that promotes dissipation of heat from at least one of the coherent light source and the control unit 50 which controls emission of coherent light from the portable lighting device 10. Such a portable lighting device 10 can be stably used for a long period of time.

According to one specific example of the aforementioned embodiment, a surface to be irradiated IP can be lighted in a pattern displaying one or more of letter, picture, color pattern, symbol, mark, illustration, character and pictogram. In this lighting, an orientation of the lighting pattern X is very important. Thus, the portable lighting device 10 in the present embodiment is suitable for such a pattern-lighting.

One embodiment has been described above based on the specific examples, but these specific examples do not intend to limit the one embodiment. The aforementioned embodiment can be implemented in various other specific examples and can be variously omitted, replaced, changed and added, as long as such an embodiment departs from the scope of the present disclosure.

Modification examples are described herebelow with reference to the drawings. In the below description and the drawings used in the below description, a part that can be similarly constituted to the above specific examples has the same reference sign as that of corresponding part of the above embodiment, and overlapped description is omitted.

For example, in the aforementioned specific example, only the diffractive optical element 40 is hold by the support body 15 of the casing 11. However, the present disclosure is not limited to this example.

As shown in FIG. 2B, the support body 15 may support the diffractive optical element 40 and a part of the shaping optical system 30. In the example shown in FIG. 2B, the second lens 32 of the shaping optical system 30, in addition to the diffractive optical element 40, is supported by the support body 15. The first lens 31 of the shaping optical system 30, the coherent light source 20, the power source 48, the control unit 50 and so on are supported by the casing body 12. In this example, the second lens 32 is preferably supported to be rotatable about the rotation axis line RA parallel to an optical axis of the coherent light incident on the second lens 32. In this case, similarly to the aforementioned specific example, a surface to be irradiated IP can be accurately lighted in a desired pattern.

Similarly, as shown in FIG. 2C, the support body 15 may support the diffractive optical element 40 and the shaping optical system 30. In the example shown in FIG. 2C, the entire shaping optical system 30, in addition to the diffractive optical element 40, is supported by the support body 15. The coherent light source 20, the power source 48, the control unit 50 and so on are supported by the casing body 12. In this example, the shaping optical system 30 is preferably supported to be rotatable about the rotation axis line RA parallel to an optical axis of coherent light incident on the shaping optical system 30. In this case, similarly to the aforementioned specific example, a surface to be irradiated IP can be accurately lighted in a desired pattern.

Further, as shown in FIG. 2D, the support body 15 may support the diffractive optical element 40, the shaping optical system 30 and the coherent light source 20. In the example shown in FIG. 2D, the shaping optical system 30 and the coherent light source 20, in addition to the diffractive optical element 40, are supported by the support body 15. The coherent light source 20 is supported by the support body 15 through the circuit board 22. The power source 48, the control unit 50 and so on are supported by the casing body 12. In this example, irrespective of the rotation of the support body 15 with respect to the casing body 12, relative positions of the coherent light source 20, the shaping optical system 30 and the diffractive optical element 40 are maintained. Thus, a surface to be irradiated IP can be accurately lighted in a desired pattern.

In the examples shown in FIGS. 2B to 2D, the outer tubular part 13 of the casing body 12 and the inner tubular part 16 of the support body 15 are extended along the rotation axis line RA, so that the support body 15 can support more members. On the other hand, the switch 45 is provided on the casing body 12. Thus, a user U can operate the switch 45 and rotate the support body 15, while holding the casing body 12.

Figure 7:
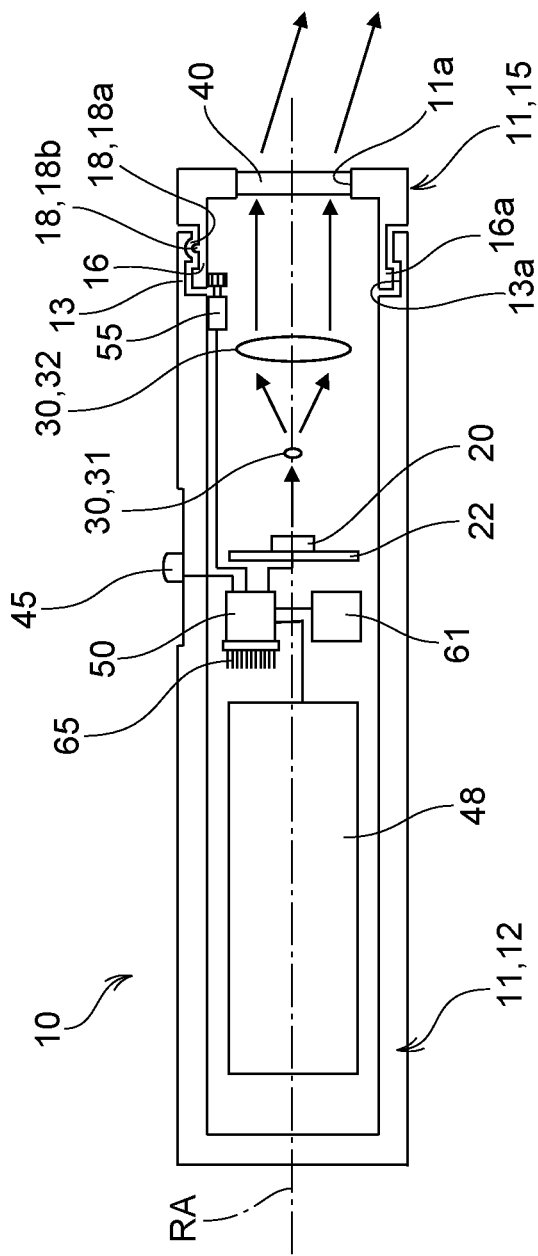
FIG. 7 is a view corresponding to FIG. 2A, for explaining another modification example of the portable lighting device.

As an alternative modification example, as shown in FIG. 7, the portable lighting device 10 may further comprise a rotation drive unit 55 that rotates the diffractive optical element 40. In the portable lighting device 10 shown in FIG. 7, the support body 15 can be relatively rotated with respect to the casing body 12 by the rotation drive unit 55. An action of the rotation drive unit 55 may be controlled by the control unit 50 based on an operation by a user U on the switch 45, for example. As shown in FIG. 7, a geared motor can be used as the rotation drive unit 55, for example. In the example shown in FIG. 7, the inner surface of the inner tubular part 16 of the support body 15 is provided with internal teeth that mesh with the gears of the rotation drive unit 55. Alternatively, a linear motor provided between the outer tubular part 13 of the casing body 12 and the inner tubular part 16 of the support body 15 may be adopted as the rotation drive unit 55.

The action of the rotation drive unit 55 may be controlled based on a detection result of a detection unit 61 provided on the portable lighting device 10, in place of the operation of the switch 45 or in addition to the operation of the switch 45. In the example shown in FIG. 7, the portable lighting device 10 further has the detection unit 61 that acquires information about at least one of an orientation of the portable lighting device 10 and an orientation of the surface to be irradiated IP. The rotation drive unit 55 may rotate the diffraction optical element 40 by a rotation amount based on the detection result of the detection unit 61.

For example, a gyro sensor, an acceleration sensor, an inertial sensor, etc. may be used as the detection unit 61 that acquires information about an orientation of the portable lighting device 10. These sensors can specify an orientation of the portable lighting device 10. In general use, a user H is likely to point the distal end of the portable lighting device 10 to the surface to be irradiated IP. By utilizing this tendency, the fact that the portable lighting device 10 is pointed downward to light the floor F or ground surface as the surface to be irradiated IP, and the fact that the portable lighting device 10 is pointed upward to light the ceiling C as a surface to be irradiated IP can be specified.

Alternatively, an imaging device may be used as the detection unit 61 that acquires information about an orientation of the portable lighting device 10. The imaging device can image a surface to be irradiated IP, which is located at a position to which the portable lighting device 10 is pointed, and can specify an orientation of the surface to be irradiated IP by image processing.

In such a portable lighting device 10, the rotation of the diffractive optical element 40 is adjusted by the rotation drive unit 55 depending on an orientation of the portable lighting device 10, which may indicate an orientation of a surface to be irradiated IP, or an orientation of the surface to be irradiated IP itself. Namely, a desired surface to be irradiated IP can be lighted in an intended pattern by the drive of the rotation drive unit 55. Thus, the convenience of the portable lighting device 10 can be further improved.

As further another modification example, the rotation drive unit 55 may rotate the diffractive optical element by a rotation amount based on information from outside. Information from outside may include information from sensors installed in an environment where the portable lighting device 10 is used, and weather and/or traffic information from public broadcasting and so on. The sensors installed in an environment where the portable lighting device 10 is used may be, for example, a sensor that detects a surface to be irradiated IP to be pattern-lighted and an orientation of the surface to be irradiated IP, more specifically, a brightness sensor and an illumination sensor.

In such a portable lighting device 10, the rotation of the diffractive optical element 40 is adjusted by the rotation drive unit 55 based on information from the external sensors installed on a place where the portable lighting device 10 is used. According to this example, since the control of the rotation drive unit 55 enables lighting on a desired surface to be irradiated IP in an intended pattern, the convenience of the portable lighting device 10 can be further improved.

Figure 8:
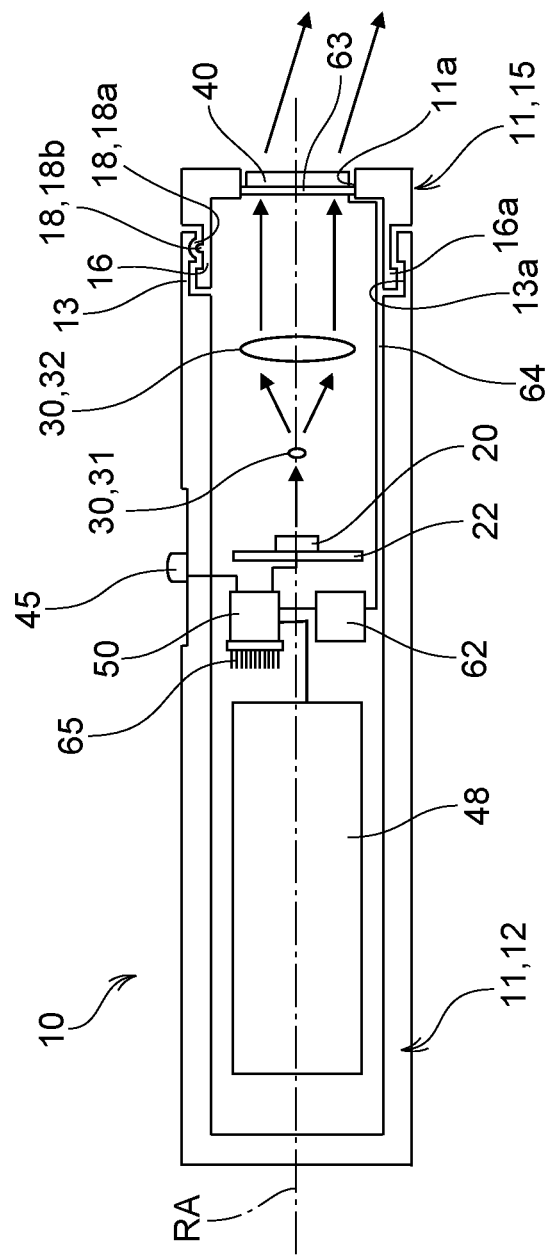
FIG. 8 is a view corresponding to FIG. 2A, for explaining further another modification example of the portable lighting device.
Figure 9:
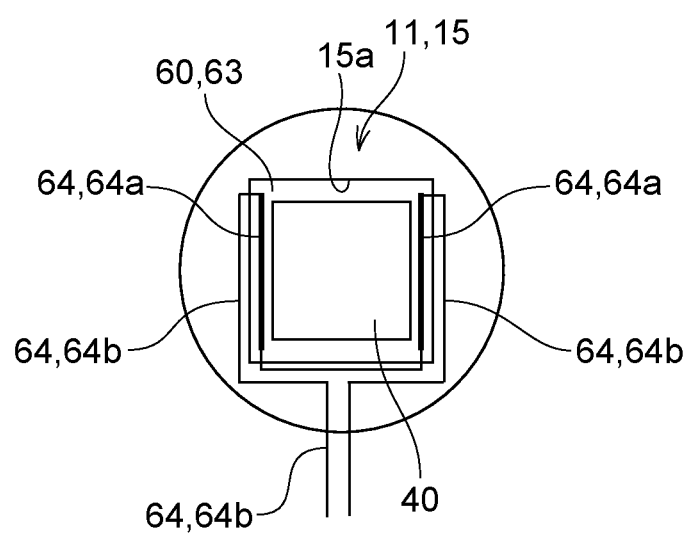
FIG. 9 is a plan view showing a diffractive optical element and a support body of the portable lighting device of FIG. 8, for explaining a structure for detecting an abnormality of a diffractive optical element.

As further another modification example, as shown in FIGS. 8 and 9, the portable lighting device 10 further has a detection unit 62 that acquires information about a state of the diffraction optical element 40. When the detection unit 62 is used to know a state of the diffraction optical element 40, an abnormality such as detachment of the diffractive optical element 40 can be detected. For example, when the abnormality of the diffractive optical element 40 is detected, the control unit 50 can stop emission of coherent light from the portable lighting device 10. In the illustrated portable lighting device 10, the diffractive optical element 40 serves as an emergent end of lighting light, and thus can be directly seen from outside. Since the state of the diffractive optical element 40 can be known with the use of the detection unit 62, the coherent light can be effectively prevented from continuously emerging from the portable lighting unit 10, with the diffractive optical element 40 being detached therefrom. This can improve laser safety.

In the example shown in FIGS. 8 and 9, the detection unit 62 has a fixing member 63 fixed to the diffraction optical element 40, and a detection circuit 64 which is formed to bridge between the fixing member 63 and the casing 11. The fixing member 63 is made of a transparent member, for example. In the illustrated example, the fixing member 63 is fixed to the opening 15a of the support body 15 and supports the diffractive optical element 40. The detection circuit 64 has a first circuit wiring 64a formed on the fixing member 63, and a second circuit wiring 64b formed on the casing 11. When the fixing member 63 is held by the casing 11 at an intended position, the first circuit wiring 64a and the second circuit wiring 64b are electrically connected to each other. When the fixing member 63 is moved to be displaced or inclined with respect to the casing 11, the first circuit wiring 64a and the second circuit wiring 64b are electrically disconnected from each other. A state of the diffractive optical element 40 can be known by the detection circuit 64 that detects an abnormality of the fixing member 63 due to disconnection of the detection circuit 64. Particularly in the example shown in FIG. 9, the first circuit wiring 64a and the second circuit wiring 64b of the detection circuit 64 are electrically connected to each other at four points near four corners of the diffractive optical element 40. The detection circuit 64 forms a circuit that connects the four connection points in series. Such a detection unit 62 can accurately detect an abnormality of the diffractive optical element 40 caused by positional displacement of the fixing member 63.

The term "transparent" means to have a visible light transmittance of at least 50% or more, more preferably a visible light transmittance of 70% or more. The visible light transmittance is obtained as follows. A spectral transmittance in a wavelength range of from 380 nm to 780 nm is measured according to JIS A5759-2008 by using an infrared visible ultraviolet spectrophotometer ("UV-3100PC") manufactured by Shimadzu Corporation, and a value specified from the spectral transmittance based on a formula defined in this standard is regarded as a visible light transmittance.

Figure 10:
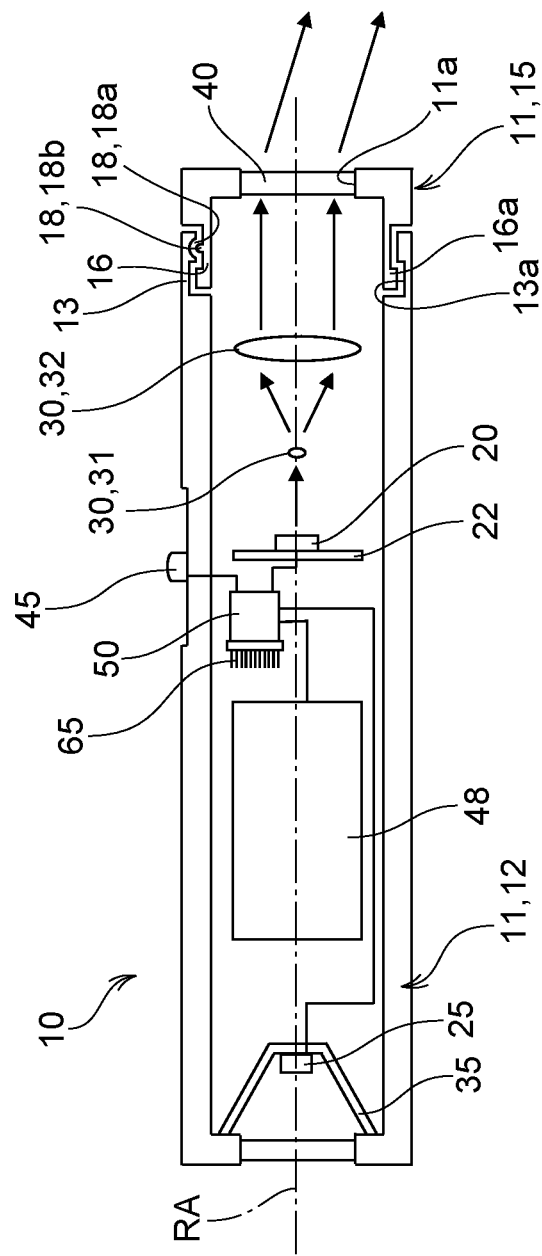
FIG. 10 is a view corresponding to FIG. 2A, for explaining further another modification example of the portable lighting device.

As further another modification example, as shown in FIG. 10, the portable lighting device 10 may have a non-coherent light source 25. An LED light source or the like may be used as the non-coherent light source 25, for example. The portable lighting device 10 can perform general lighting with the use of the non-coherent light source 25, separately from the pattern-lighting using the coherent light source 20. In the illustrated example, the portable lighting device 10 further has a second shaping optical system 35 that shapes light emitted from the non-coherent light source 25. The second shaping optical system 35 is formed as a reflecting mirror, for example. In the illustrated example, pattern-lighting light from the coherent light source 20 emerges from one end surface of the casing 11 in the longitudinal direction thereof, and general lighting light from the non-coherent light source 25 emerges from the other end surface of the casing 11 in the longitudinal direction thereof. Note that not limited to this example, pattern-lighting light from the coherent light source 20 and general lighting light from the non-coherent light source 25 may emerge from the same end surface of the casing 11 in the longitudinal direction thereof. According to such a portable lighting device 10, light from the non-coherent light source 25 can be used as general lighting that lights an environment surrounding a user U. Thus, the convenience of the portable lighting device 10 can be further improved.

As further another modification example, the portable lighting device 10 may further have a scanner 36 that changes an optical path of coherent light emitted from the coherent light source 20. The scanner 36 changes an optical path of coherent light such that the coherent light scans the diffractive optical element 40. The scanner 36 typically changes an optical path of coherent light with time to change an incident position of the coherent light on the diffractive optical element 40. As a result, the coherent light whose traveling direction is changed by the scanner 36 scans the incident surface of the diffractive optical element 40.

Figure 12:
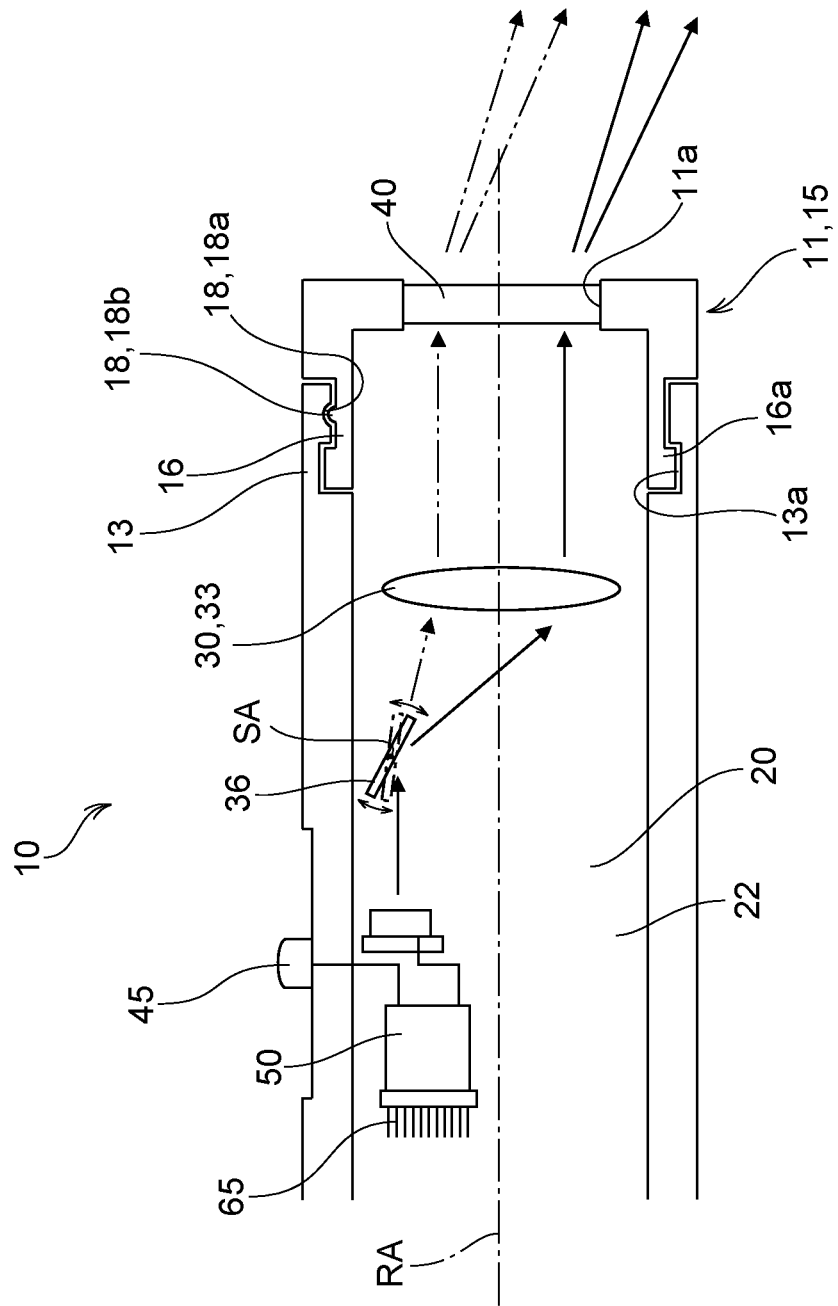
FIG. 12 is view for explaining further another modification example of the portable lighting device, at a section similar to FIG. 2A.

In the example shown in FIG. 12, the scanner 36 includes a reflection device having a reflecting surface rotatable about one axis line SA. To be more specific, the reflection device is configured as a mirror device having a mirror serving as a reflecting surface rotatable about the one axis line SA. Note that the illustrated scanner 36 is a mere example, and various apparatuses, which change a traveling direction of light such that a light incident position scans the diffractive optical element 40, may be widely used as the scanner 36.

As described above, the diffractive optical element 40 has the diffractive optical subelements 41. The scanner 36 changes optical paths of coherent light such that the coherent light is incident on the respective diffractive optical subelements 41. By controlling emission of the coherent light from the coherent light source 20 or blocking traveling of the coherent light with a shutter or the like depending on timings at which coherent light is incident on the respective diffractive optical subelements 41, only a coherent light diffracted by a desired diffractive optical subelement 41 can be directed toward an area to be irradiated IA on a surface to be irradiated IP. Namely, a lighting pattern X on the surface to be irradiated IP can be changed. The control of the coherent light source 20 and the not-shown shutter depending on timings at which coherent light is incident on the respective diffractive optical subelements 41 may follow a control signal from the control unit 50.

A scanning speed of the scanner 36 is a speed which cannot be decomposed by the human eye. Thus, although coherent light is projected repeatedly onto each area on the surface to be irradiated IP, it seems as if coherent light is continuously projected thereonto.

According to such an example, when the diffractive optical subelements 41 direct coherent light to the same area with each other, a diffractive optical subelement 41 to be used can be selected. When the diffractive optical subelements 41 direct coherent light to areas different from one another, a lighting pattern X on an area to be irradiated IA can be changed. Namely, the area to be irradiated IA can be pattern-lighted, and a lighting pattern X and the area to be irradiated IA can be changed.

In the example shown in FIG. 12, the diffractive optical element 40 diffracts coherent light whose optical path has been changed by the scanner 36 to a surface to be irradiated IP. A lens 33 is provided between the scanner 36 and the diffractive optical element 40. The lens 33 serves as the shaping optical system 30 and adjusts an optical path of coherent light incident on the diffractive optical element 40. To be specific, light whose optical path has been adjusted by the lens 33 of the shaping optical system 30 traces an optical path of light included in parallel light bundle to be incident on the diffractive optical element 40.

Figure 13:
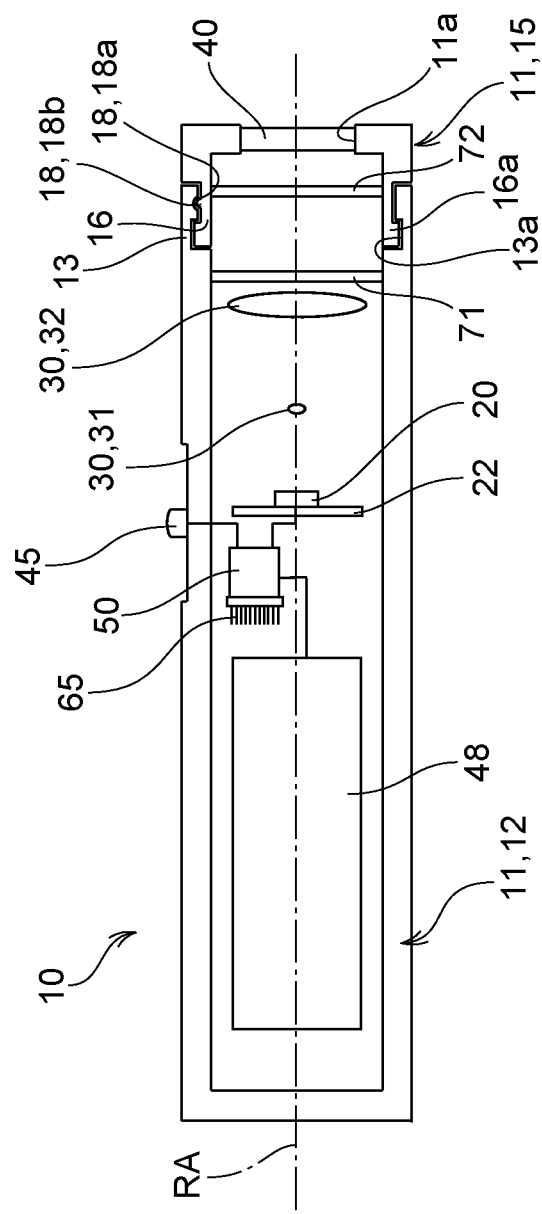
FIG. 13 is a view corresponding to FIG. 2A, for explaining further another modification example of the portable lighting device.

As further another modification example, as shown in FIG. 13, the portable lighting device 10 may be subjected to a liquid-proof treatment, particularly a waterproof treatment. In the example shown in FIG. 13, the portable lighting device 10 has a first liquid-proof member 71 and a second liquid-proof member 72. The casing 11 is provided with the first liquid-proof member 71. Particularly in the illustrated example, the first liquid-proof member 71 is provided near the opening 11*a* of the casing 11. In other words, the first liquid-proof member 71 is provided at a position of the casing 11, which is displaced from the outer tubular part 13 to the inside of the casing 11. The power source 48, the control unit 50 and further the coherent light source 20 are arranged in an area surrounded by the casing 11 and the first liquid-proof member 71.

In this example, since the casing 11 is covered with the first liquid-proof member 71, even when a liquid is going to enter the casing 11 from between the outer tubular part 13 and the inner tubular part 16, entry of the liquid, in particular water to the inside of the casing 11 can be effectively prevented. Namely, the first liquid-proof member 71 hermetically seals an inside space of the casing body 12 in which the coherent light source 20 is housed. Thus, wetting of the constituent elements such as the power source 48, the control unit 50 and the coherent light source 20 with the liquid, in particular water can be effectively prevented by the first liquid-proof member 71. As a result, a short circuit in the electric circuit included in the portable lighting device 10 can be effectively avoided.

In the example shown in FIG. 13, the support body 15 is provided with the second liquid-proof member 72. The second liquid-proof member 72 is provided near the opening 15*a* of the support body 15. Particularly in the illustrated example, the second liquid-proof member 72 is provided at a position of the support body 15, which displaced from the inner tubular part 16 to the inside of the casing 11. Since the casing 11 is covered with the second liquid-proof member 72, even when liquid is going to enter the casing 11 from between the outer tubular part 13 and the inner tubular part 16, entry of the liquid, in particular water to the inside of the support body 15 can be effectively prevented. Thus, even when liquid enters the casing 11 from between the outer tubular part 13 and the inner tubular part 16, wetting of the diffractive optical element 40 held by the support body 15 with the liquid, in particular water inside the support body 15 can be effectively prevented.

A diffractive optical element, which is formed particularly as a relief type hologram, causes a diffraction phenomenon by means of an uneven surface. When a liquid comes into contact with the uneven surface, a difference in refractive index on the uneven surface changes, so that the diffractive optical element 40 cannot provide an expected diffraction phenomenon. In order to prevent this, the diffractive optical element 40 is supported by the support body 15 such that the uneven surface of the relief type diffractive optical element 40 faces inside the support body 15, and the inside of the support body 15 is covered with the second liquid-proof member 72. Thus, an expected diffraction phenomenon can be stably obtained.

The first liquid-proof member 71 and the second liquid-proof member 72 are provided on a path of coherent light. Thus, the first liquid-proof member 71 and the second liquid-proof member 72 are preferably transparent in order not to shield coherent light. For example, the first liquid-proof member 71 and the second liquid-proof member 72 may be plate members made of resin such as acryl or the like, glass, etc. The first liquid-proof member 71 and the second liquid-proof member 72 are held at their peripheries by the casing body 12 or the support body 15 of the casing 11. A adhesive or a glue may be provided between the first liquid-proof member 71 and the casing 11 and between the second liquid-proof member 72 and the casing 11, so that the entry of liquids to the casing 11 may be stably prevented.

Figure 14:
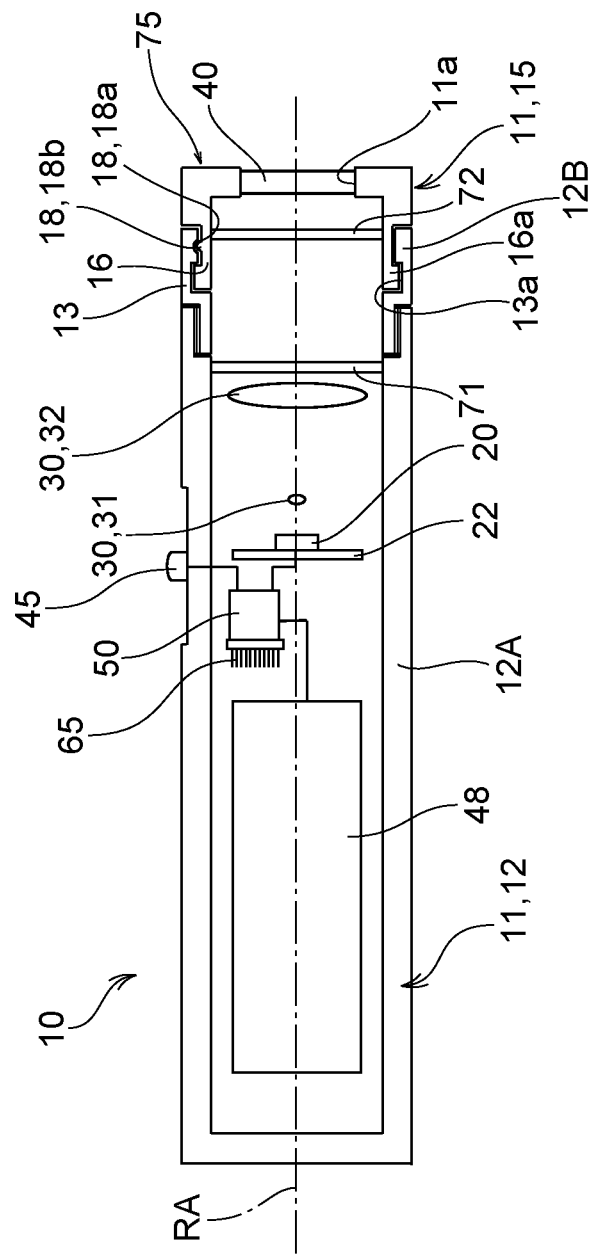
FIG. 14 is a view corresponding to FIG. 2A, for explaining further another modification example of the portable lighting device.

Further, as shown in FIG. 14, the casing body 12 of the casing 11 may have a casing housing 12A that houses the coherent light source 20, and a distal-end holder 12B detachable from a distal end of the casing housing 12A. The casing body 12 is formed as a tubular member with one opened end on the distal-end holder 12B side. In the illustrated example, the casing housing 12A is formed as a tubular member with one end opened. On the other hand, the distal-end holder 12B is formed as a tubular member with both ends opened. The casing housing 12A and the distal-end holder 12B can be detachably attached to each other through a fixing means for fixing them to each other. In the illustrated example, the distal-end holder 12B is detachably attached to the casing housing 12 by a fixing means composed of an internal thread of the casing housing 12A and an external thread of the distal-end holder 12B. The distal-end holder 12B has the aforementioned outer tubular part 13, and is connected to the support body 15 to be rotatable about the rotation axis line RA.

In this example, the distal-end holder 12B and the support body 15 form a diffractive optical element unit 75. The diffractive optical element unit 75 includes the diffractive optical element 40 held by the support body 15. When a plurality of the diffractive optical element units 75 including the diffractive optical elements 40 having different diffraction characteristics are prepared, different areas to be irradiated IA can be lighted on a surface to be irradiated IP by suitably selecting one diffractive optical element unit 75 and attaching it to the casing housing 12A.

Further, in the example shown in FIG. 14, the support body 15 is provided with the second liquid-proof member 72 which has been already described with reference to FIG. 13. In this example, the relief type diffractive optical element 40 may be held by the support member 15 such that the uneven surface of the diffractive optical element 40 faces the inside of the support body 15. Even when a liquid enters the casing 11 from between the outer tubular part 13 and the inner tubular part 16, wetting of the diffractive optical element 40 supported by the support body 15 with the liquid, in particular water inside the support body 15 can be effectively prevented.

Similarly, in the example shown in FIG. 14, the casing housing 12A is provided with the first liquid-proof member 71 which has been already described with reference to FIG. 13. Thus, since the casing housing 12A is covered with the first liquid-proof member 71, even when a liquid is going to enter the casing 11 from between the outer tubular part 13 and the inner tubular part 16, entry of the liquid, in particular water to the inside of the casing 11 can be effectively prevented.

In the lighting device according to the aforementioned embodiment, the diffractive optical element is rotatably supported, but the present disclosure is not limited thereto. With the use of a lighting device having a coherent light source, and a diffractive optical element that diffracts coherent light from the coherent light source to a surface to be irradiated, a surface to be irradiated, which is positioned on, e.g., a floor surface, may be lighted. Then, by rotating the lighting device to a position different from the former, another surface to be irradiated, which is positioned on e.g., a wall surface or a ceiling surface, may be lighted.

Although some modification examples to the aforementioned embodiment have been described above, it goes without saying that some modification examples can be suitably combined and applied.

The invention claimed is:

1. A portable lighting device comprising:
a coherent light source; and
a diffractive optical element that diffracts coherent light from the coherent light source to a surface to be irradiated;
wherein:
the diffractive optical element is rotatably supported;
a normal direction of the diffractive optical element is not parallel to a normal direction of the surface to be irradiated;
the coherent light incident on the diffractive optical element includes coherent light incident on a position at which a rotation axis line of the diffractive optical element intersects with the diffractive optical element; and
the surface to be irradiated is lighted in a pattern depending on a diffraction pattern of the diffractive optical element, the pattern indicating a direction or an orientation.

2. The portable lighting device according to claim 1, further comprising a shaping optical system that shapes coherent light emitted from the coherent light source, wherein;
the diffractive optical element diffracts the coherent light shaped by the shaping optical system to the surface to be irradiated; and
the diffractive optical element is supported to be relatively rotatable with respect to the shaping optical system.

3. The portable lighting device according to claim 1, wherein
an angular range within which the diffractive optical element is rotatable is 45° or more.

4. The portable lighting device according to claim 1, wherein
the diffractive optical element is supported to be rotatable about an axis line parallel to an optical axis of the coherent light incident on the diffractive optical element.

5. The portable lighting device according to claim 1, wherein
an incident position of 0th-order light advancing from the diffractive optical element is within an area on the surface to be irradiated, the coherent light diffracted by the diffractive optical element being incident on the area.

6. The portable lighting device according to claim 1, further comprising a casing having a tubular casing body that supports the coherent light source, and a support body that supports the diffractive optical element and is rotatable with respect to the casing body;
wherein a position at which a center axis line of the casing body intersects with the surface to be irradiated is positioned within an area on the surface to be irradiated, the coherent light diffracted by the diffractive optical element being incident on the area.

7. The portable lighting device according to claim 1, wherein
the coherent light is incident on the same diffractive optical element before and after rotation of the diffractive optical element.

8. The portable lighting device according to claim 1, wherein
the diffractive optical element is held at any of preset positions.

9. The portable lighting device according to claim 1, further comprising a casing having a casing body that supports the coherent light source, and a support body that supports the diffractive optical element and is rotatable with respect to the casing body.

10. The portable lighting device according to claim 9, wherein
the casing body is provided with a switch for operating the portable lighting device.

11. The portable lighting device according to claim 10, wherein
the switch is provided at a position apart from a rotation axis line of the diffractive optical element.

12. The portable lighting device according claim 1, further comprising:
a detection unit that acquires information about at least one of an orientation of the portable lighting device and an orientation of the surface to be irradiated; and
a rotation drive unit that rotates the diffractive optical element by a rotation amount based on a detection result of the detection unit.

13. The portable lighting device according claim 1, further comprising a rotation drive unit that rotates the diffractive optical element by a rotation amount based on any one of information from a sensor installed in an environment where the portable lighting device is used, weather information from public broadcasting, and traffic information from public broadcasting.

14. The portable lighting device according to claim 1, further comprising:
a detection unit that detects information about a state of the diffractive optical element; and
a control unit that stops emission of the coherent light from the portable lighting device based on a detection result of the detection unit.

15. The portable lighting device according to claim 1, further comprising a heat dissipating means that promotes dissipation of heat from at least one of the coherent light source and a control unit that controls emission of the coherent light from the portable lighting device.

16. The portable lighting device according to claim 1, for lighting the surface to be irradiated in a pattern displaying one or more of letter, picture, color pattern, symbol, mark, illustration, character, and pictogram.

17. The portable lighting device according to claim 1, further comprising a non-coherent light source.

18. The portable lighting device according to claim 1, capable of lighting a first surface to be irradiated in a lighting pattern indicating a direction or an orientation, and capable of, by rotating the diffractive optical element, lighting a second surface to be irradiated not parallel to the first surface to be irradiated in a lighting pattern indicating the same direction or the same orientation as the direction or the orientation.

19. The portable lighting device according to claim 1, capable of lighting a first surface to be irradiated in a lighting pattern indicating a direction or an orientation, and capable of, by rotating the diffractive optical element, lighting a second surface to be irradiated opposed to the first surface to be irradiated in a lighting pattern indicating the same direction or the same orientation as the direction or the orientation.

20. A lighting method comprising:
a step adjusting a rotated position of a diffractive optical element of a lighting device based on a surface to be irradiated, wherein the lighting device comprises a coherent light source, and the diffractive optical element that is rotatable with respect to the coherent light source and diffracts coherent light from the coherent light source to a surface to be irradiated; and
a step of lighting the surface to be irradiated in a pattern depending on a diffraction pattern of the diffractive optical element;
wherein:
the lighting device is capable of lighting a first surface to be irradiated when the diffractive optical element is located at a predetermined rotated position; and
in the step of adjusting a rotated position of the diffractive optical element,
when an orientation of a second surface to be irradiated to be lighted is an orientation rotated in the clockwise direction from the first surface to be irradiated, seen from a position of the lighting device, the diffractive optical element is rotated in the clockwise direction from the predetermined rotated position, the second surface to be irradiated being nonparallel to the first surface to be irradiated and a normal direction of the diffractive optical element being not parallel to a normal direction of the surface to be irradiated, or
when an orientation of a second surface to be irradiated to be lighted is an orientation rotated in the counterclockwise direction from the first surface to be irradiated, seen from a position of the lighting device, the diffractive optical element is rotated in the counterclockwise direction from the predetermined rotated position.

21. The lighting method according to claim 20, wherein:
when the diffractive optical element is located at a predetermined position, the lighting device is capable of lighting the first surface to be irradiated in a lighting pattern indicating a direction or an orientation;
in the step of adjusting a rotated position of the diffractive optical element, the diffractive optical element is rotated to light a second surface to be irradiated not parallel to the first surface to be irradiated in a lighting pattern indicating the same direction or the same orientation as the direction or the orientation.

22. The lighting method according to claim 20, wherein:
when the diffractive optical element is located at a predetermined position, the lighting device is capable of lighting the first surface to be irradiated in a lighting pattern indicating a direction or an orientation;
in the step of adjusting a rotated position of the diffractive optical element, the diffractive optical element is rotated to light a second surface to be irradiated opposed to the first surface to be irradiated in a lighting pattern indicating the same direction or the same orientation as the direction or the orientation.

23. The lighting method according to claim 22, wherein in the step of adjusting a rotated position of the diffractive optical element, the diffractive optical element is rotated at 180°.

* * * * *